(12) United States Patent
Yabe et al.

(10) Patent No.: US 11,264,848 B2
(45) Date of Patent: Mar. 1, 2022

(54) ROTOR, MOTOR, COMPRESSOR, FAN, AND AIR CONDITIONING APPARATUS

(71) Applicant: Mitsubishi Electric Corporation, Tokyo (JP)

(72) Inventors: Koji Yabe, Tokyo (JP); Yoshikazu Fujisue, Tokyo (JP); Kazuya Kumagai, Tokyo (JP); Takahiro Tsutsumi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 225 days.

(21) Appl. No.: 16/479,240

(22) PCT Filed: Mar. 27, 2017

(86) PCT No.: PCT/JP2017/012426
§ 371 (c)(1),
(2) Date: Jul. 19, 2019

(87) PCT Pub. No.: WO2018/179063
PCT Pub. Date: Oct. 4, 2018

(65) Prior Publication Data
US 2020/0014259 A1 Jan. 9, 2020

(51) Int. Cl.
*H02K 1/27* (2006.01)
*H02K 1/2706* (2022.01)
(Continued)

(52) U.S. Cl.
CPC ............ *H02K 1/2706* (2013.01); *H02K 1/27* (2013.01); *H02K 1/276* (2013.01); *H02K 1/28* (2013.01); *H02K 21/26* (2013.01)

(58) Field of Classification Search
CPC ........ H02K 1/27; H02K 1/2706; H02K 1/276; H02K 1/2773; H02K 1/28; H02K 21/26
(Continued)

(56) References Cited

U.S. PATENT DOCUMENTS 10,931,155 B2 * 2/2021 Yabe .................. H02K 15/12
2007/0273232 A1 11/2007 Ong et al.
(Continued)

FOREIGN PATENT DOCUMENTS

CN 104871409 A 8/2015
CN 106533008 A 3/2017
(Continued)

OTHER PUBLICATIONS

Office Action dated Apr. 24, 2020 issued in corresponding Australian patent application No. 2017407862.
(Continued)

*Primary Examiner* — Tulsidas C Patel
*Assistant Examiner* — Rashad H Johnson
(74) *Attorney, Agent, or Firm* — Posz Law Group, PLC

(57) ABSTRACT

A rotor core has first and second magnet insertion holes along an outer circumference, and first and second slits along an inner circumference. The first and second slits have first and second facing portions facing each other. The first facing portion has a first inner end and a first outer end. The second facing portion has a second inner end and a second outer end. An inter-slit portion is provided between the first and second facing portions and is defined by a first straight line connecting the first and second inner ends and a second straight line connecting the first and second outer ends. In a radial direction of the rotor core, a minimum distance D1 from the inner circumference to the slits, a minimum width W1 of the slits, and a length W2 of the inter-slit portion satisfy at least one of D1<W1 and D1<W2.

23 Claims, 18 Drawing Sheets

(51) Int. Cl.
    *H02K 1/28*     (2006.01)
    *H02K 1/276*    (2022.01)
    *H02K 21/26*    (2006.01)

(58) Field of Classification Search
    USPC ............ 310/156.01, 156.43, 156.49, 156.53,
                                        310/156.57, 156.68
    See application file for complete search history.

(56) References Cited

U.S. PATENT DOCUMENTS

| | | |
|---|---|---|
| 2008/0224558 A1 | 9/2008 | Ionel |
| 2014/0001906 A1* | 1/2014 | Li .................. H02K 29/03 |
| | | 310/156.01 |
| 2015/0084468 A1* | 3/2015 | Nigo ................ H02K 1/276 |
| | | 310/156.53 |
| 2015/0318764 A1 | 11/2015 | Baba et al. |
| 2016/0181877 A1 | 6/2016 | Ishikawa et al. |
| 2016/0268856 A1 | 9/2016 | Oketani et al. |
| 2016/0294235 A1 | 10/2016 | Takizawa et al. |
| 2017/0310179 A1* | 10/2017 | Okouchi ............. H02K 1/276 |
| 2019/0068015 A1 | 2/2019 | Yabe et al. |
| 2021/0083536 A1* | 3/2021 | Baba ................. H02K 1/2773 |

FOREIGN PATENT DOCUMENTS

| | | |
|---|---|---|
| JP | 2001-186701 A | 7/2001 |
| JP | 2006-060976 A | 3/2006 |
| JP | 2008-022601 A | 1/2008 |
| WO | 2017/033239 A1 | 3/2017 |

OTHER PUBLICATIONS

International Search Report of the International Searching Authority dated Jun. 13, 2017 for the corresponding International application No. PCT/JP2017/012426 (and English translation).
Indian Office Action, dated Feb. 26, 2021, issued in corresponding IN Patent Application No. 201947035957 (and English Machine Translation).
Extended European Search Report dated Feb. 18, 2020 issued in corresponding EP patent application No. 17902996.2.
Office Action dated Nov. 16, 2020 issued in corresponding CN patent application No. 201780087864.3 (and English machine translation).
Office Action dated Aug. 14, 2020 issued in corresponding KR patent application No. 10-2019-7025204 (and English translation).
Office Action dated Jun. 23, 2021 issued in corresponding CN patent application No. 201780087864.3 (and English machine translation).

* cited by examiner

ROTOR, MOTOR, COMPRESSOR, FAN, AND AIR CONDITIONING APPARATUS

CROSS REFERENCE TO RELATED APPLICATION

This application is a U.S. national stage application of International Patent Application No. PCT/JP2017/012426 filed on Mar. 27, 2017, the disclosure of which is incorporated herein by reference.

TECHNICAL FIELD

The present invention relates to a rotor, a motor, a compressor, a fan, and an air conditioning apparatus.

BACKGROUND

A rotor of a motor includes a rotor core formed by a stacked body of electromagnetic steel sheets, and a shaft serving as a rotation shaft. The shaft is generally fixed to an inner circumference of the rotor core by shrink fitting (see, for example, Patent Reference 1).

PATENT REFERENCE

Patent Reference 1: Japanese Patent Application Publication No. 2008-22601 (see paragraphs 0024 to 0032)

However, in an interior permanent magnet (IPM) motor having permanent magnets embedded in a rotor, heat may be transmitted from the rotor core to the permanent magnets during shrink fitting, and the permanent magnets may be demagnetized.

SUMMARY

The present invention is intended to solve the above described problem, and an object of the present invention is to suppress demagnetization of permanent magnets mounted in a rotor.

A rotor according to the present invention includes a rotor core having an inner circumference in an annular shape about an axis, and an outer circumference positioned on an outer side of the inner circumference in a radial direction about the axis. The rotor core is formed by electromagnetic steel sheets. The rotor core has a first magnet insertion hole and a second magnet insertion hole along the outer circumference and adjacent to each other in a circumferential direction about the axis, and has a first slit and a second slit along the inner circumference and adjacent to each other in the circumferential direction. A first permanent magnet is provided in the first magnet insertion hole, and a second permanent magnet is provided in the second magnet insertion hole. The first slit has a first facing portion that faces the second slit, and the second slit has a second facing portion that faces the first slit. The first facing portion has a first inner end at an inner end of the first facing portion in the radial direction, and a first outer end at an outer end of the first facing portion in the radial direction. The second facing portion has a second inner end at an inner end of the second facing portion in the radial direction, and a second outer end at an outer end of the second facing portion in the radial direction. The rotor core has an inter-slit portion between the first facing portion and the second facing portion, the inter-slit portion being defined by a first straight line connecting the first inner end to the second inner end and a second straight line connecting the first outer end to the second outer end. The inter-slit portion is disposed on an inner side in the radial direction of an inter-pole portion between the first magnet insertion hole and the second magnet insertion hole. When D1 represents a minimum distance from the inner circumference of the rotor core to the first slit and the second slit in the radial direction, W1 represents a minimum width of the first slit and the second slit in the radial direction, and W2 represents a length of the inter-slit portion in the radial direction, at least one of D1<W1 and D1<W2 is satisfied.

In the present invention, when D1<W1 is satisfied, as compared to a region between the inner circumference of the rotor core and the slit, the slit provided on the outer side of the region in the radial direction has a larger width, and therefore less heat is transmitted to the magnet insertion holes. As a result, demagnetization of the permanent magnets due to heat can be suppressed. When D1<W2 is satisfied, heat paths passing through the inter-slit portion are lengthened, and therefore less heat is transmitted to the magnet insertion holes. As a result, demagnetization of the permanent magnets due to heat can be suppressed.

DETAILED DESCRIPTION

First Embodiment (Configuration of Motor 100)

Figure 1:
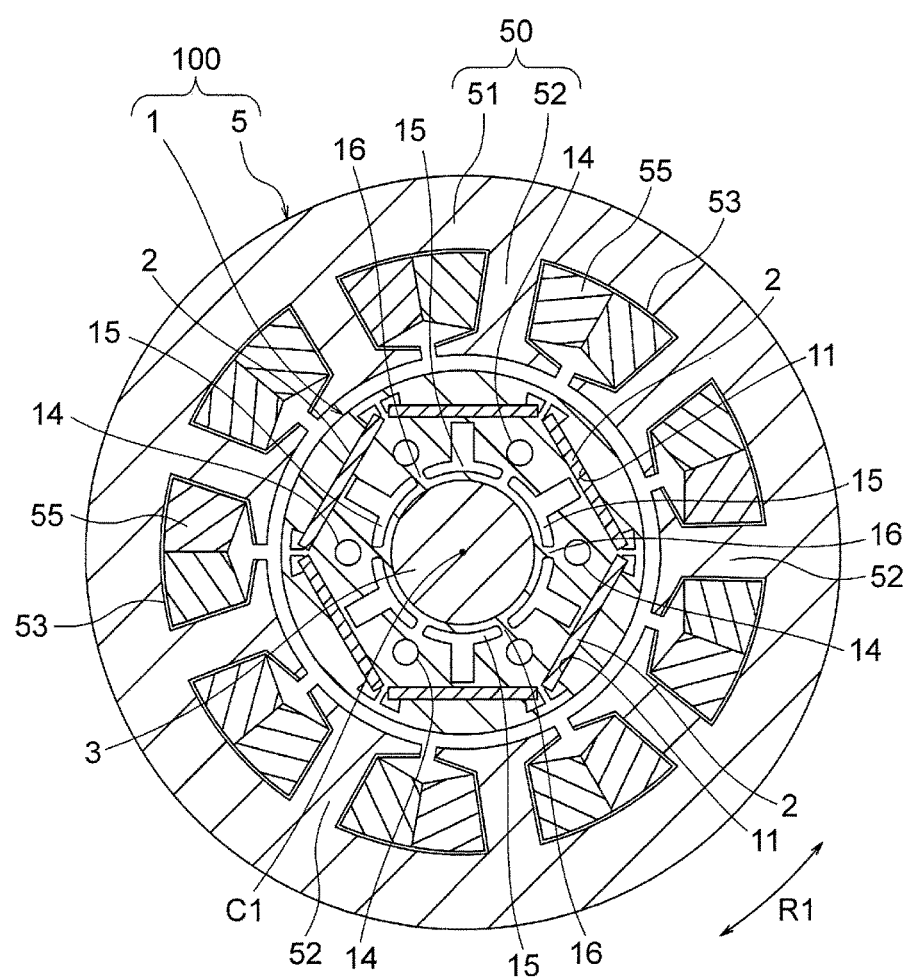
FIG. 1 is a cross sectional view illustrating a motor according to a first embodiment.

A first embodiment of the present invention will be described first. FIG. 1 is a cross sectional view illustrating a motor 100 according to the first embodiment. The motor 100 is configured as a brushless DC motor, and rotation of the motor 100 is controlled by frequency control performed by a controller having an inverter.

The motor 100 is implemented as an inner rotor motor including a cylindrical rotor 1, and an annular stator 5 provided so as to surround the rotor 1. An air gap of, for example, 0.5 mm is formed between the stator 5 and the rotor 1. The motor 100 is implemented as an interior permanent magnet motor having permanent magnets 2 embedded in the rotor 1.

Hereinafter, a rotation axis of the rotor 1 is defined as an axis C1, a direction of the axis C1 will be referred to as an "axial direction". A direction (indicated by an arrow R1 in FIG. 1) along a circumference about the axis C1 will be referred to as a "circumferential direction", and a radial direction about the axis C1 will be referred to as a "radial direction". A cross sectional view is a sectional view taken along a plane perpendicular to the axis C1, and a longitudinal sectional view is a sectional view taken along a plane parallel to the axis C1 (a plane including the axis C1).

(Configuration of Stator 5)

The stator 5 is disposed on an outer side of the rotor 1 in the radial direction so as to surround the rotor 1. The stator 5 includes a stator core 50, and coils 55 wound around the stator core 50. The stator core 50 is made of a plurality of electromagnetic steel sheets stacked in the axial direction and fastened together by crimping or the like. A thickness of the electromagnetic steel sheet is in a range of 0.1 to 1.0 mm, and an example of the thickness is 0.35 mm.

The stator core 50 includes a yoke 51 extending in the circumferential direction about the axis C1, and a plurality of teeth 52 extending inward in the radial direction (toward the axis C1) from the yoke 51. The teeth 52 are arranged at equal intervals in the circumferential direction about the axis C1. Inner end faces of the teeth 52 in the radial direction face an outer circumferential surface of the rotor 1 across the above described air gap. Slots are formed between adjacent teeth 52, and the slots are spaces for accommodating the coils 55. The number of the teeth 52 (that is, the number of the slots) is 9 in this example, but the number of the teeth 52 may be any number.

Insulators (insulating portions) 53 are mounted on the stator core 50. The insulators 53 are interposed between the stator core 50 and the coils 55 and insulate the stator core 50 and the coils 55 from each other. The insulators 53 are formed by molding resin integrally with the stator core 50 or attaching a resin molding body molded as a separate part onto the stator core 50.

The coils 55 are made of material such as copper or aluminum, and wound around the teeth 52 via the insulators 53. The coil 55 may be wound around every tooth 52 (concentrated winding), or may be wound across a plurality of teeth 52 (distributed winding).

(Configuration of Rotor 1)

Figure 2:
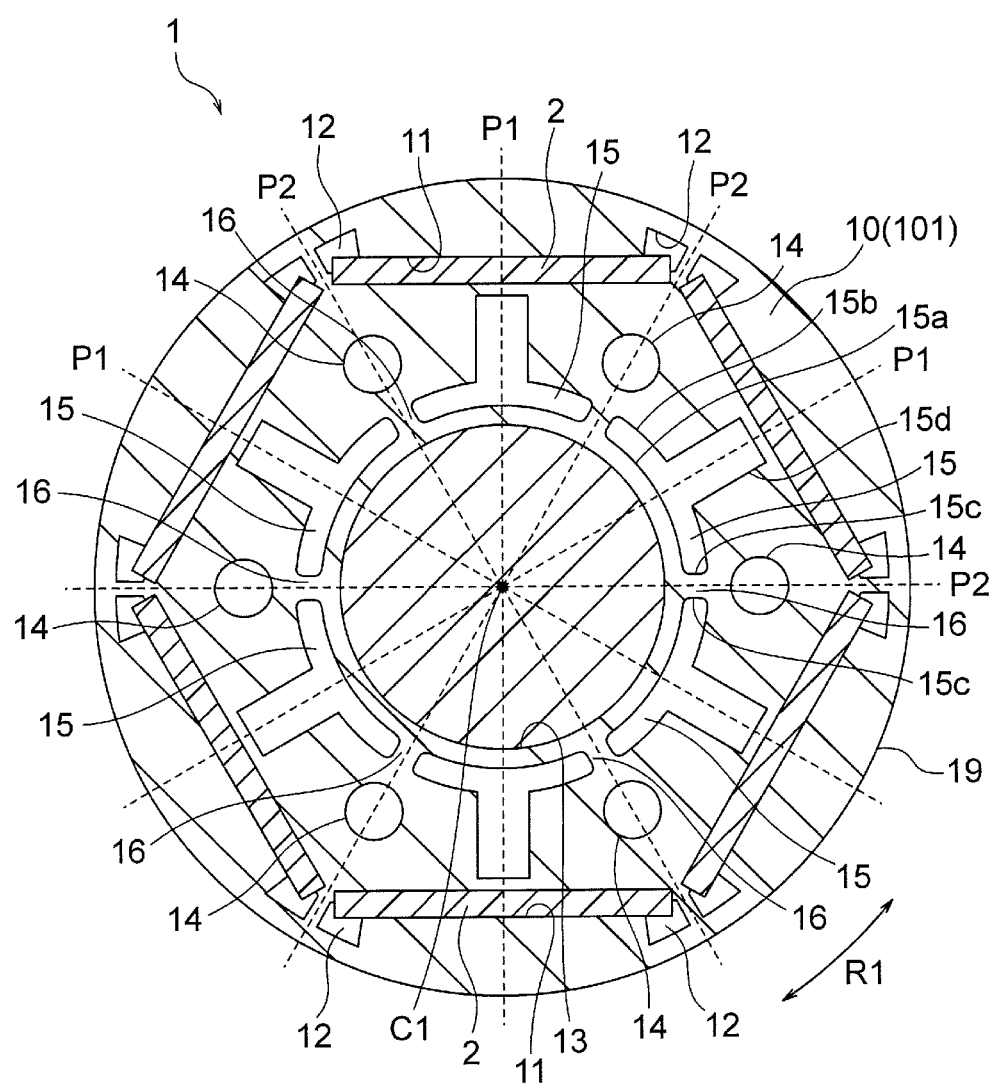
FIG. 2 is a cross sectional views illustrating a rotor according to the first embodiment.

FIG. 2 is a cross sectional view illustrating the rotor 1. The rotor 1 includes a rotor core 10 having a cylindrical shape about the axis C1. The rotor core 10 is made of a plurality of electromagnetic steel sheets stacked in the axial direction and fastened together by crimping or the like. A thickness of the electromagnetic steel sheet is in a range of 0.1 to 1.0 mm, and an example of the thickness is 0.35 mm.

The rotor core 10 has an inner circumference 13 and an outer circumference 19. Both of the inner circumference 13 and the outer circumference 19 have annular shapes (circular shapes) about the axis C1. The inner circumference 13 defines a shaft hole (shaft insertion hole) into which a shaft 3 is fixed by shrink fitting. The shaft 3 is made of, for example, metal.

A plurality (first number) of magnet insertion holes 11 are formed along the outer circumference 19 of the rotor core 10. In this example, six magnet insertion holes 11 are arranged at equal intervals in the circumferential direction, but the number of the magnet insertion holes 11 may be any number.

Plate-like permanent magnets 2 are inserted into the magnet insertion holes 11. In this example, the number of the magnet insertion holes 11 is 6, and the number of the permanent magnets 2 is also 6. In other words, the rotor 1 has six poles. However, the number of the poles is not limited to 6, and may be any number.

Each permanent magnet 2 has a width in the circumferential direction of the rotor core 10, and has a thickness in the radial direction. The permanent magnet 2 is made of, for example, a neodymium rare-earth magnet containing iron (Fe), neodymium (Nd), and boron (B). Dysprosium (Dy) may be added to the permanent magnet 2 as needed. The permanent magnet 2 is magnetized in a direction of the thickness (radial direction of the rotor 1).

The permanent magnets 2 disposed in the magnet insertion holes 11 form magnetic poles. Centers of the magnet insertion holes 11 in the circumferential direction (that is, centers of the permanent magnets 2 in the circumferential direction) serve as pole centers P1. An inter-pole portion P2 is formed between every adjacent two magnet insertion holes 11. When a certain magnet insertion hole 11 is referred to as a first magnet insertion hole, a magnet insertion hole 11 adjacent thereto in the circumferential direction will also be referred to as a second magnet insertion hole. The permanent magnet 2 disposed in the first magnet insertion hole and the permanent magnet 2 disposed in the second magnet insertion hole will also be referred to as a first permanent magnet and a second permanent magnet, respectively.

In this example, one permanent magnet 2 is disposed in one magnet insertion hole 11, but a plurality of permanent magnets 2 may be disposed in one magnet insertion hole 11 side by side in the circumferential direction. In such a case, the plurality of permanent magnets 2 in the same magnet insertion hole 11 are magnetized so that the same poles face outward in the radial direction. The magnet insertion hole 11 extends linearly in this example, but may extend in, for example, a V shape.

A flux barrier (a leakage magnetic flux suppression hole) 12 is formed continuously to each end of the magnet insertion hole 11 in the circumferential direction. The flux barrier 12 suppresses leakage magnetic flux between adjacent permanent magnets 2. A core part between the flux barrier 12 and the outer circumference of the rotor core 10 form a thin-wall portion in order to suppress short-circuit of the magnetic flux between the adjacent permanent magnets 2. A thickness of the thin portion is desirably equal to the thickness of the electromagnetic steel sheet of the rotor core 10.

A plurality of slits 15 are formed along the inner circumference 13 of the rotor core 10. The number of the slits 15 is equal to the number of the poles, that is, 6. The number of the slits 15 is not necessarily equal to the number of the poles, but it is desirable that the number of the slits 15 is a number obtained by dividing the number of the poles by N (natural number), as will be described later.

In this example, one slit 15 is formed on an inner side of one magnet insertion hole 11 in the radial direction. The slits 15 extend in the circumferential direction about the axis C1. A center of the slit 15 in the circumferential direction and a center of the magnet insertion hole 11 in the circumferential direction are at the same positions in the circumferential direction. As long as the slits 15 have lengths in the circumferential direction, the slits 15 may extend, for example, linearly.

Figure 3:
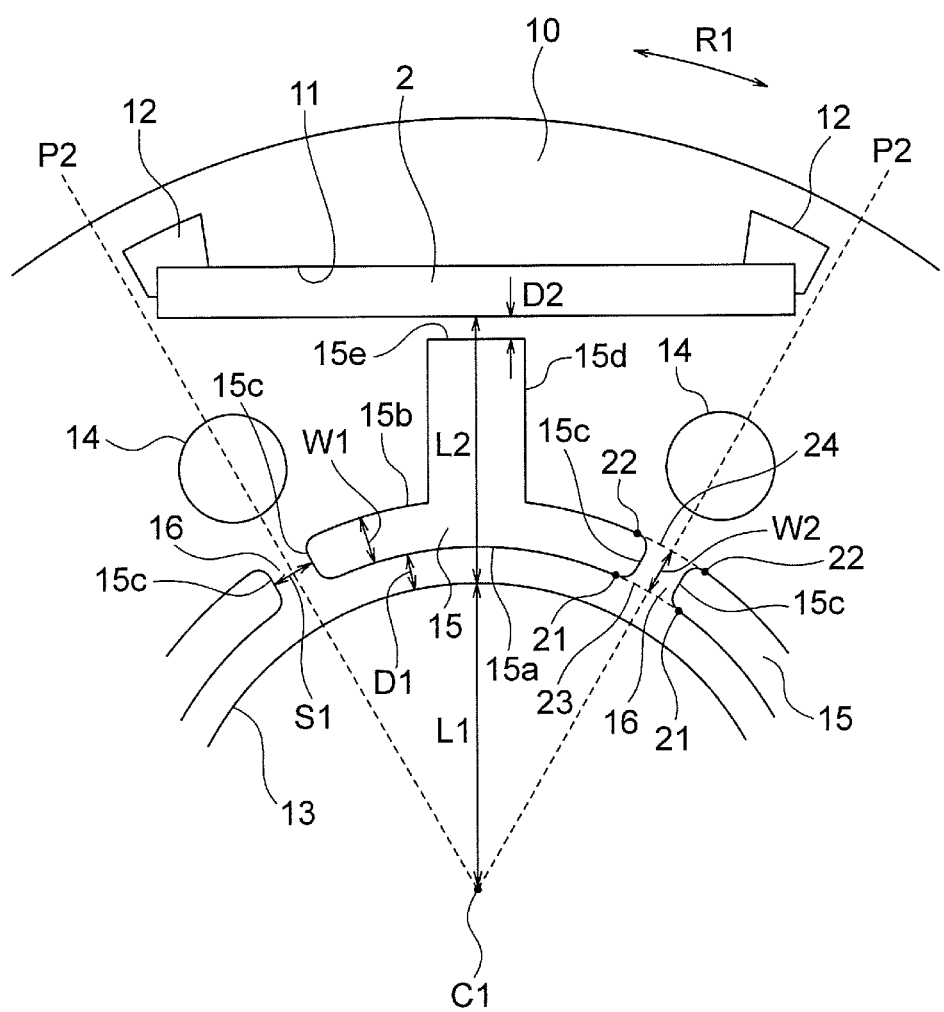
FIG. 3 is an enlarged view illustrating a part of a rotor core according to the first embodiment.

FIG. 3 is an enlarged view illustrating a part of the rotor core 10 in the first embodiment. The slit 15 has an inner circumference edge 15a facing the inner circumference 13 of the rotor core 10, and an outer circumference edge 15b located on an outer side of the inner circumference edge 15a in the radial direction. Both of the inner circumference edge 15a and the outer circumference edge 15b extend in the circumferential direction about the axis C1.

A minimum distance from the inner circumference 13 of the rotor core 10 to the inner circumference edge 15a of the slit 15 in the radial direction is defined as a distance D1. In an example illustrated in FIG. 3, the distance from the inner circumference 13 of the rotor core 10 to the inner circumference edge 15a of the slit 15 in the radial direction is uniform for one slit 15, and is uniform among the plurality of slits 15. However, the distance from the inner circumference 13 of the rotor core 10 to the inner circumference edge 15a of the slit 15 in the radial direction is not necessarily uniform for one slit 15, and may vary among the plurality of slits 15.

A minimum width of the slit 15 in the radial direction (that is, a minimum interval between the inner circumference edge 15a and the outer circumference edge 15b in the radial direction) is defined as a width W1. In the example illustrated in FIG. 3, the width of the slit 15 in the radial direction is uniform except at an opening portion 15d to be described later, and is uniform among the plurality of slits 15. However, the width of the slit 15 in the radial direction is not necessarily uniform for one slit 15, and may vary among the plurality of slits 15.

In the first embodiment, the distance (minimum distance) D1 from the inner circumference 13 of the rotor core 10 to the slit 15 in the radial direction, and the width (minimum width) W1 of the slit 15 in the radial direction satisfy a relation D1<W1. This is in order to set the width of the slit 15 larger, so that less heat is transmitted toward the outer circumference 19 of the rotor core 10 when the shaft 3 is fitted into the inner circumference 13 of the rotor core 10 by shrink fitting, as will be described later.

A facing portion 15c is formed at each end of the slit 15 in the circumferential direction. The facing portions 15c of the adjacent slits 15 face each other in the circumferential direction. In other words, the facing portion 15c (first facing portion) of the slit 15 (first slit) located at the center in FIG. 3, and the facing portion 15c (second facing portion) of the slit 15 (second slit) located on the right in FIG. 3 face each other in the circumferential direction.

Figure 4A:
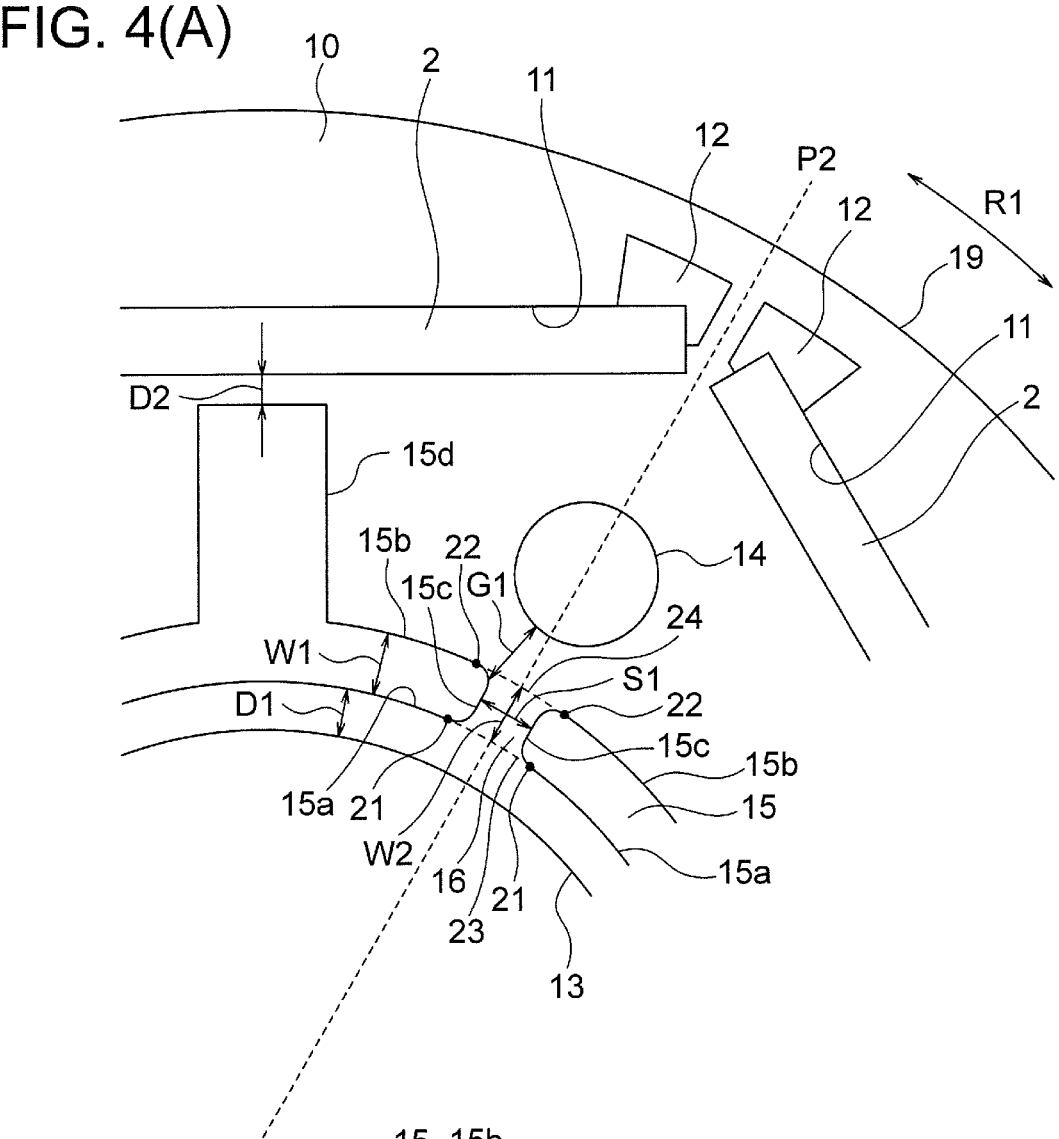
FIG. 4(A) is an enlarged view illustrating a part of the rotor core according to the first embodiment.
Figure 4B:
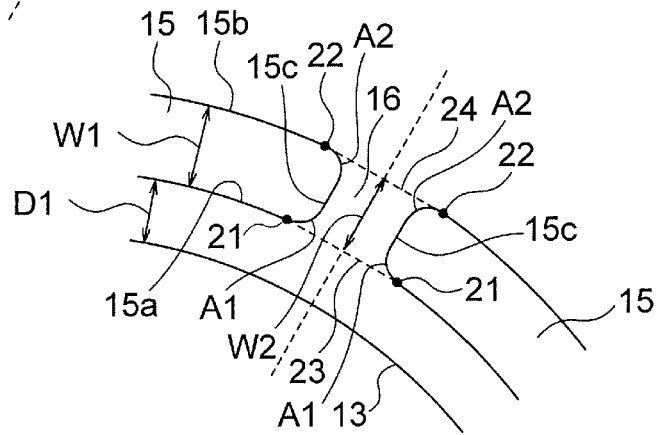
FIG. 4(B) is a schematic view illustrating an inter-slit portion.

FIG. 4(A) is an enlarged view illustrating a portion corresponding to the inter-pole portion P2 of the rotor core 10. FIG. 4(B) is an enlarged view illustrating a portion between adjacent slits 15. As illustrated in FIG. 4(A), an inner end of the facing portion 15c in the radial direction is defined as an inner end 21. Similarly, an outer end of the facing portion 15c in the radial direction is defined as an outer end 22.

As illustrated in FIG. 4(B), the facing portion 15c of the slit 15 includes a portion linearly extending from the inner circumference 13 toward the outer circumference 19, an arcuate curved portion A1 provided on an inner side of the extending portion in the radial direction, and an arcuate curved portion A2 provided on an outer side of the extending portion in the radial direction. The inner end 21 is a contact point between the curved portion A1 and the inner circumference edge 15a. The outer end 22 is a contact point between the curved portion A2 and the outer circumference edge 15b.

A straight line connecting the inner ends 21 of the facing portions 15c of the adjacent slits 15 to each other will be referred to as a first straight line 23. A straight line connecting the outer ends 22 of the facing portions 15c of the adjacent slits 15 to each other will be referred to as a second straight line 24.

More specifically, the straight line connecting the inner end 21 (first inner end) of the facing portion 15c (first facing portion) of the slit 15 (first slit) located on the left in FIG. 4(B) to the inner end 21 (second inner end) of the facing portion 15c (second facing portion) of the slit 15 (second slit) located on the right in FIG. 4(B) will be referred to as a first straight line 23. Similarly, the straight line connecting the outer end (first outer end) of the facing portion 15c (first facing portion) of the slit 15 (first slit) located on the left in FIG. 4(B) to the outer end 22 (second outer end) of the facing portion 15c (second facing portion) of the slit 15 (second slit) located on the right in FIG. 4(B) will be referred to as a second straight line 24.

A region defined by the first straight line 23 and the second straight line 24 between the facing portions 15c of the adjacent slits 15 will be referred to as an inter-slit portion 16. In other words, the inter-slit portion 16 is a region having two ends in the circumferential direction defined by the facing portions 15c of two slits 15, and having two ends in the radial direction defined by the first straight line 23 and the second straight line 24.

In this example, both ends of the inter-slit portion 16 in the radial direction are defined by the first straight line 23 and the second straight line 24, but the first straight line 23 may be replaced with a curve in the circumferential direction connecting the inner ends 21 to each other, and the second straight line may be replaced with a curve in the circumferential direction connecting the outer ends 22 to each other.

The inter-slit portion 16 is located on an inner side of the inter-pole portion P2 of the rotor 1 in the radial direction. More specifically, the position of the inter-slit portion 16 in the circumferential direction coincides with the position of the inter-pole portion P2 of the rotor 1 in the circumferential direction. The inter-slit portion 16 serves as a path of heat transmitted from the inner circumference 13 toward the outer circumference 19 when the shaft 3 is fitted into the shaft hole of the rotor core 10 by shrink fitting.

A length of the inter-slit portion 16 in the radial direction (that is, an interval between the first straight line 23 and the second straight line 24 in the radial direction) is defined as a length W2. In the example illustrated in FIG. 4(B), the width W1 of the slit 15 in the radial direction and the length W2 of the inter-slit portion 16 in the radial direction are equal to each other, but they may be different from each other. The length W2 of the inter-slit portion 16 in the radial direction is larger than the above described distance D1 from the inner circumference 13 of the rotor core 10 to the slit 15 in the radial direction (D1<W2).

As illustrated in FIG. 4(A), a minimum width of the inter-slit portion 16 in the circumferential direction is defined as a width S1. In the example illustrated in FIG. 4(A), the width of the inter-slit portion 16 is the smallest at a part between the straight portions of the two facing portions 15c, and therefore the width at this part corresponds to the width S1. The width S1 is equal to or larger than a sheet thickness of the electromagnetic steel sheet of the rotor core 10, and is smaller than two times the sheet thickness. In this regard, the "sheet thickness" means a thickness of one electromagnetic steel sheet.

Air holes 14 are formed as openings on the outer side of the slits 15 in the radial direction and on the inner side of the magnet insertion holes 11 in the radial direction. The air holes 14 are implemented as openings formed to pass through the rotor core 10 in the axial direction. The air holes 14 serve as holes which allow fluid to pass, or holes into which rivets are inserted. The fluid is air when the motor 100 is used in a fan, and is refrigerant when the motor 100 is used in a compressor. Each air hole 14 has a circular cross section in this example, but the cross section of the air hole 14 is not limited to a circular shape, and may be, for example, a rectangular shape.

The air hole 14 is disposed on an outer side of the inter-slit portion 16 in the radial direction. More specifically, the inter-slit portion 16, the air hole 14, and the inter-pole portion P2 are aligned in the radial direction. A minimum distance from the slit 15 to the air hole 14 is defined as a distance G1. The distance G1 is equal to or larger than the sheet thickness of the electromagnetic steel sheet of the rotor core 10, and is smaller than two times the sheet thickness.

With reference to FIG. 3 again, the slit 15 includes an opening portion 15d extending toward the magnet insertion hole 11 in the radial direction. The opening portion 15d extends from a central portion of the outer circumference edge 15b in the circumferential direction toward a central portion of the magnet insertion hole 11 in the circumferential direction. A minimum distance between the opening portion 15d and the magnet insertion hole 11 is defined as a distance D2. Here, the distance D2 is a distance between the magnet insertion hole 11 and an end edge 15e of the opening portion 15d facing the magnet insertion hole 11. The distance D2 is equal to or larger than the sheet thickness of the electromagnetic steel sheet of the rotor core 10, and is smaller than two times the sheet thickness.

Figure 5:
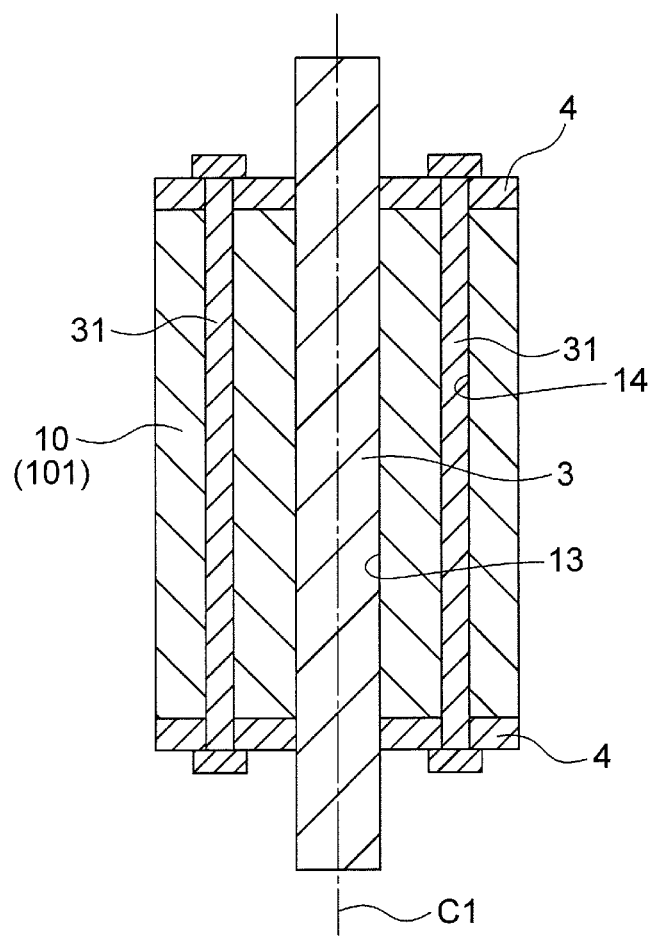
FIG. 5 is a longitudinal sectional view illustrating the rotor according to the first embodiment.

FIG. 5 is a longitudinal sectional view illustrating the rotor 1. The rotor 1 includes the rotor core 10 formed of a stacked body of a plurality (fourth number) of electromagnetic steel sheets 101 stacked in the axial direction, a shaft 3 provided through the shaft hole of the rotor core 10, and a pair of end plates 4 provided so as to hold the rotor core 10 from both ends in the axial direction. In the first embodiment, the shaft 3 is fitted into the inner circumference 13 of all of the electromagnetic steel sheets 101 constituting the rotor core 10.

The end plates 4 are provided for preventing the permanent magnets 2 from falling out of the magnet insertion holes 11. Rivets 31 are provided through the rotor core 10 and the end plates 4, and the end plates 4 are fixed to the rotor core 10 by the rivets 31. The rivets 31 are inserted into the air holes 14 (FIG. 3) of the rotor core 10. Holes into which the rivets 31 are inserted may be formed in the rotor core 10, in addition to the air holes 14.

Figure 6:
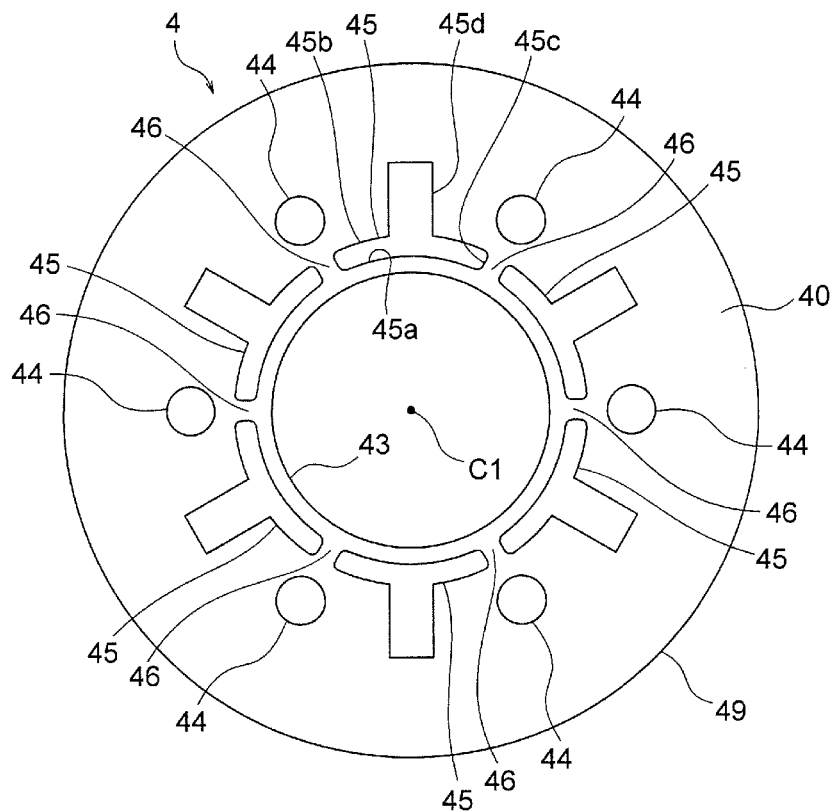
FIG. 6 is a plan view illustrating an end plate of the rotor according to the first embodiment.

FIG. 6 is a plan view illustrating the end plate 4. The end plate 4 includes an inner circumference 43 and an outer circumference 49 both having annular shapes about the axis C1, a plurality of slits 45 formed along the inner circumference 43, and air holes 44 formed on an outer side of the slits 45 in the radial direction.

A shape and a dimension of the inner circumference 43 of the end plate 4 correspond to those of the inner circumference 13 of the rotor core 10, but they are not necessarily exactly the same. A shape and a dimension of the outer circumference 49 of the end plate 4 correspond to those of the outer circumference 19 of the rotor core 10, but they are not necessarily exactly the same. In particular, the inner circumference 43 of the end plate 4 is formed to be larger than the inner circumference 13 of the rotor core 10. A shape and a dimension of the slit 45 of the end plate 4 correspond to those of the slit 15 of the rotor core 10, but they are not necessarily exactly the same. A shape and a dimension of the air hole 44 of the end plate 4 correspond to those of the air hole 14 of the rotor core 10, but they are not necessarily exactly the same.

The end plate 4 includes no openings at portions corresponding to the magnet insertion holes 11 of the rotor core 10. This is in order to prevent the permanent magnets 2 from falling out of the magnet insertion holes 11.

Functions of Embodiment

Next, functions of the first embodiment will be described. In a manufacturing process of the rotor 1, each electromagnetic steel sheet is punched by a press machine. Then, a plurality of punched electromagnetic steel sheets are stacked in the axial direction, and integrated together by crimping or the like, so that the rotor core 10 is obtained.

Then, the permanent magnets 2 are inserted into the magnet insertion holes 11 of the rotor core 10. The permanent magnets 2 are fixed into the magnet insertion holes 11 by clearance fitting. The end plates 4 are mounted on both ends of the rotor core 10 in the axial direction, and the rotor core 10 and the end plates 4 are fastened together by the rivets 31.

The shaft 3 is fixed by shrink fitting into the shaft hole defined by the inner circumference 13 of the rotor core 10. In the shrink fitting, the rotor core 10 is heated by induction heating (IH) from the inner circumference 13 side to thermally expand the rotor core 10 to increase an inner diameter of the shaft hole. In a state where the inner diameter of the shaft hole of the rotor core 10 is increased, the shaft 3 is inserted into the shaft hole.

After the shaft 3 is inserted into the shaft hole, the rotor core 10 is cooled at a room temperature or at a lower temperature. With this operation, the inner diameter of the shaft hole of the rotor core 10 decreases, and the shaft 3 is fitted into the shaft hole. Hence, the rotor core 10 and the shaft 3 are securely fixed together.

In the shrink fitting process, heat applied from the inner circumference 13 side of the rotor core 10 is transmitted to the permanent magnets 2 in the magnet insertion holes 11. When the permanent magnets 2 are applied with heat of threshold or higher, properties of the permanent magnets 2 deteriorate. For example, in the case of the magnetized permanent magnets 2, demagnetization occurs and magnetic force decreases. In the case of non-magnetized permanent magnets 2 (that is, before being subjected to magnetization processing), performance and quality of the permanent magnets 2 deteriorate. Hereinafter, a case where the magnetized permanent magnets 2 are disposed in the magnet insertion holes 11 will be described.

Generally, the shrink fitting of the shaft 3 is performed in a state where the rotor 1 is not mounted inside the stator 5. In this state, as compared to a state (FIG. 1) where the rotor 1 is mounted inside the stator 5, a magnetic circuit has a larger number of opening areas, and thus permeance of the permanent magnets 2 decreases and demagnetization is likely to occur.

In a permanent magnet containing no dysprosium (Dy) as a rare earth element or having dysprosium content of 2 wt % or less, demagnetization due to heat is especially likely to occur. Therefore, temperature of the permanent magnet 2 in the shrink fitting process is desirably 100 to 140° C. or lower, and is especially desirably 100° C. or lower.

In order that less heat is transmitted to the magnet insertion holes 11 into which the permanent magnets 2 are inserted, the following three arrangements are available:
(1) Openings are made as large as possible in a region from the inner circumference 13 of the rotor core 10 to the magnet insertion holes 11.
(2) Heat paths from the inner circumference 13 of the rotor core 10 to the magnet insertion holes 11 are made as long as possible in the radial direction.
(3) Heat paths from the inner circumference 13 of the rotor core 10 to the magnet insertion holes 11 are made as narrow as possible in the circumferential direction.

The above described arrangement (1) is implemented by providing a plurality of slits 15 along the inner circumference 13 of the rotor core 10, and making the width (minimum width) W1 of the slit 15 in the radial direction larger than the distance (minimum distance) D1 from the inner circumference 13 to the slit 15 in the radial direction (D1<W1).

It is necessary to provide a region around the inner circumference 13 of the rotor core 10 for storing heat sufficient to maintain a state where the inner diameter of the shaft hole is increased after the rotor core 10 is heated from the inner circumference 13 side and until the insertion of the shaft 3 is completed. The distance D1 from the inner circumference 13 to the slit 15 of the rotor core 10 in the radial direction is determined so as to ensure the region for storing heat.

In order to make openings as large as possible in the region from the inner circumference 13 of the rotor core 10 to the magnet insertion holes 11, the width (minimum width) W1 of the slit 15 in the radial direction is set larger than the distance D1 from the inner circumference 13 to the slit 15 in the radial direction. This makes it possible to obtain an arrangement in which less heat is transmitted to the magnet insertion holes 11, while providing the region for storing heat around the inner circumference 13 of the rotor core 10.

The above described arrangement (2) is implemented by disposing inter-slit portions 16 serving as heat paths, on the inner side of the inter-pole portions P2 in the radial direction. As long as the inter-slit portions 16 are disposed on the inner side of the inter-pole portions P2 in the radial direction, the heat paths from the inner circumference 13 to the magnet insertion holes 11 of the rotor core 10 are curved and lengthened, and thus less heat is transmitted to the magnet insertion holes 11.

Regarding the above described arrangement (2), the length W2 of the inter-slit portion 16 in the radial direction is set larger than the distance D1 from the inner circumference 13 to the slit 15 in the radial direction (D1<W2). An arrangement in which less heat is transmitted to the magnet insertion holes 11 can be obtained by increasing lengths of heat paths (that is, the inter-slit portions 16) having narrow widths, in addition to providing a region for storing heat around the inner circumference 13 of the rotor core 10.

Figure 7:
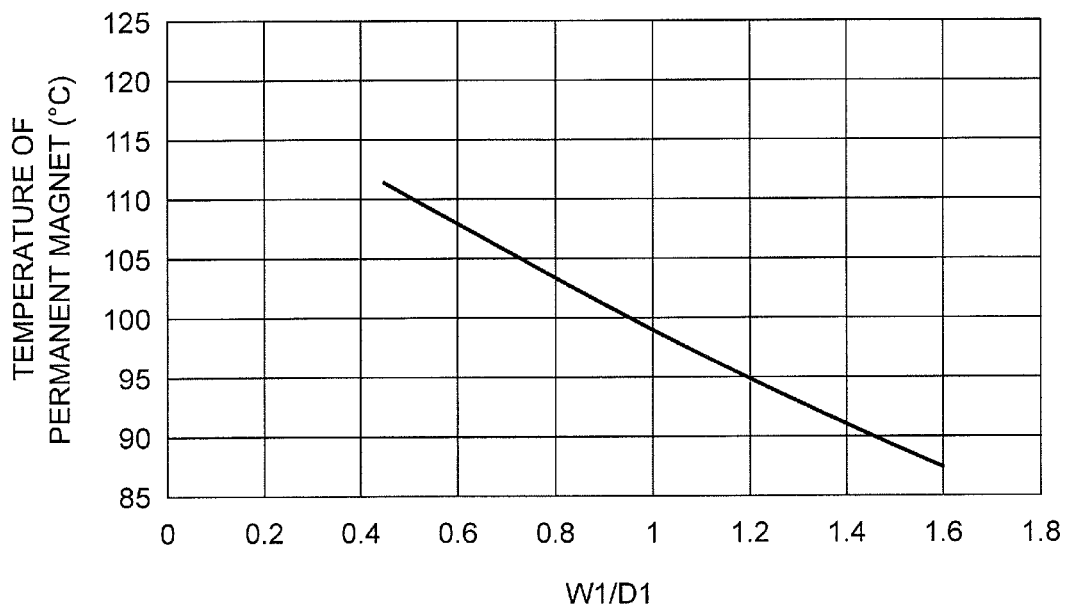
FIG. 7 is a graph illustrating a relationship between a temperature of a permanent magnet and a dimensional ratio W1/D1 in the rotor according to the first embodiment.

FIG. 7 is a graph illustrating a relationship between a temperature of the permanent magnet 2 and a ratio of the width W1 of the slit 15 in the radial direction to the distance D1 from the inner circumference 13 of the rotor core 10 to the slit 15 (referred to as a dimensional ratio W1/D1). A horizontal axis indicates the dimensional ratio W1/D1, and a vertical axis indicates the temperature of the permanent magnet 2.

From FIG. 7, it is understood that the temperature of the permanent magnet 2 decreases as the dimensional ratio W1/D1 increases. In other words, it is understood that the temperature of the permanent magnet 2 decreases as the width W1 of the slit 15 in the radial direction increases relative to the distance D1 from the inner circumference 13 of the rotor core 10 to the slit 15.

In particular, it is understood that, when the dimensional ratio W1/D1 is higher than 1, that is, when the width W1 of the slit 15 in the radial direction is larger than the distance D1 from the inner circumference 13 of the rotor core 10 to the slit 15 (D1<W1), effect of reducing the temperature of the permanent magnet 2 is high. Moreover, it is understood that, when the dimensional ratio W1/D1 is higher than 0.95, the temperature of the permanent magnet 2 can be reduced to 100° C. or lower.

Figure 8:
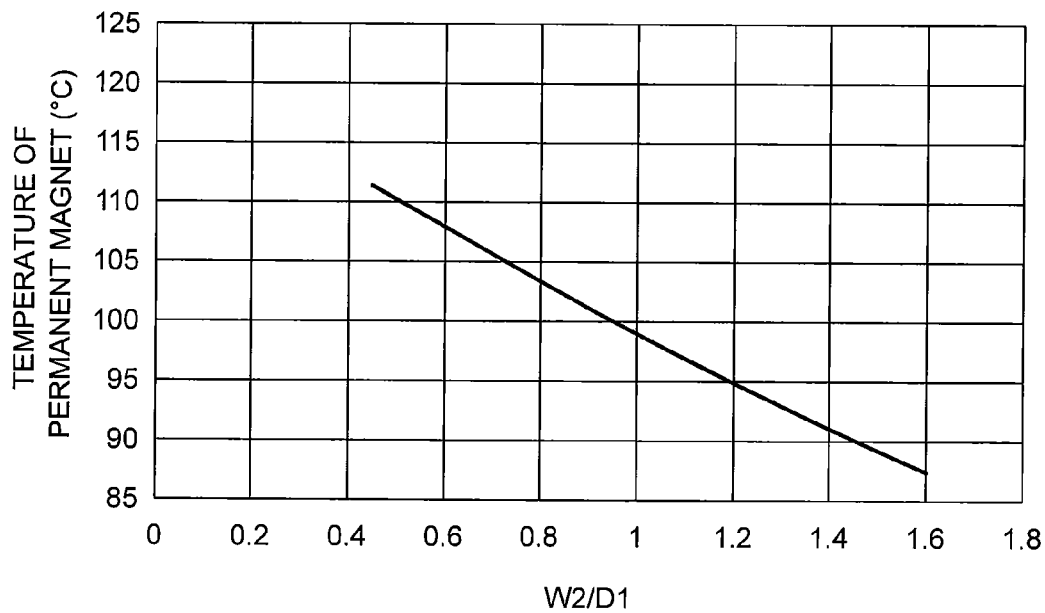
FIG. 8 is a graph illustrating a relationship between the temperature of the permanent magnet and a dimensional ratio W2/D1 in the rotor according to the first embodiment.

FIG. 8 is a graph illustrating the relationship between the temperature of the permanent magnet 2 and a ratio of the length W2 of the inter-slit portion 16 in the radial direction to the distance D1 from the inner circumference 13 of the rotor core 10 to the slit 15 (referred to as a dimensional ratio W2/D1). A horizontal axis indicates the dimensional ratio W2/D1, and a vertical axis indicates the temperature of the permanent magnet 2.

From FIG. 8, it is understood that the temperature of the permanent magnet 2 decreases as the dimensional ratio W2/D1 increases. In other words, it is understood that the temperature of the permanent magnet 2 decreases as the length W2 of the inter-slit portion 16 in the radial direction increases relative to the distance D1 from the inner circumference 13 of the rotor core 10 to the slit 15.

In particular, it is understood that, when the dimensional ratio W2/D1 is higher than 1, that is, when the length W2 of the inter-slit portion 16 in the radial direction is larger than the distance D1 from the inner circumference 13 of the rotor core 10 to the slit 15 (D1<W2), effect of reducing the temperature of the permanent magnet 2 is high. Moreover, it is understood that, when the dimensional ratio W2/D1 is higher than 0.95, the temperature of the permanent magnet 2 can be reduced to 100° C. or lower.

From the results shown in FIGS. 7 and 8, it is understood that the temperature of the permanent magnet 2 can be effectively reduced by setting the width W1 of the slit 15 in the radial direction to be larger than the distance D1 from the inner circumference 13 of the rotor core 10 to the slit 15 (D1<W1), and setting the length W2 of the inter-slit portion 16 in the radial direction to be larger than the distance D1 from the inner circumference 13 of the rotor core 10 to the slit 15 (D1<W2).

The above described arrangement (3) is implemented by setting the width (minimum width) S1 of the inter-slit portion 16 in the circumferential direction as small as possible. However, a shape finer than the sheet thickness of the electromagnetic steel sheet is difficult to form at the time of punching the electromagnetic steel sheet. Accordingly, the width (minimum width) S1 of the inter-slit portion 16 in the circumferential direction is set equal to or larger than the sheet thickness of the electromagnetic steel sheet of the rotor core 10, and set smaller than two times the sheet thickness, so that the width S1 is set as small as possible within a range in which punching is possible.

Figure 9:
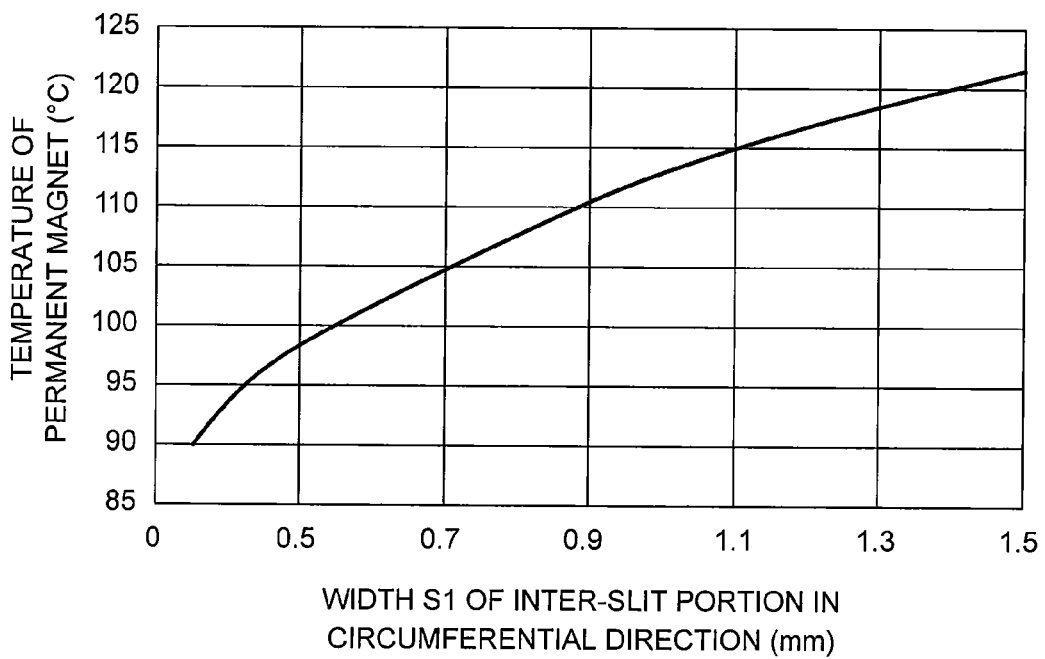
FIG. 9 is a graph illustrating a relationship between the temperature of the permanent magnet and a width S1 of an inter-slit portion in the circumferential direction in the rotor according to the first embodiment.

FIG. 9 is a graph illustrating a relationship between the temperature of the permanent magnet 2 and the width S1 of the inter-slit portion 16 in the circumferential direction. A horizontal axis indicates the width S1 of the inter-slit portion 16 in the circumferential direction, and a vertical axis indicates the temperature of the permanent magnet 2.

From FIG. 9, it is understood that the temperature of the permanent magnet 2 decreases as the width S1 of the inter-slit portion 16 in the circumferential direction decreases. As the width S1 of the inter-slit portion 16 in the circumferential direction decreases, the heat path from the inner circumference 13 toward the outer circumference 19 of the rotor core 10 is narrowed, and the narrow heat path continues by the distance W2 in the radial direction. Thus, effect of inhibiting heat transmission to the magnet insertion hole 11 is high.

In particular, it is understood that the temperature of the permanent magnet 2 can be reduced to 100° C. or lower, when the width S1 of the inter-slit portion 16 in the circumferential direction is smaller than 0.55 mm.

Since the air holes 14 are formed on the outer side of the slits 15 in the radial direction, both of the distance D1 from the inner circumference 13 of the rotor core 10 to the slit 15 in the radial direction, and the width S1 of the inter-slit portion 16 in the circumferential direction can be set smaller as compared to the case where the air holes 14 are formed in the inter-slit portions 16 or formed on the inner side of the slits 15 in the radial direction.

In particular, when the air hole 14 is formed on the outer side of the inter-slit portion 16 in the radial direction (that is, on the inner side of the inter-pole portion P2 in the radial direction), heat transmitted toward the outer circumference 19 of the rotor core 10 passes through between the slit 15 and the air hole 14, and thus the heat paths from the inner circumference 13 toward the outer circumference 19 of the rotor core 10 can further be narrowed.

The distance (minimum distance) G1 between the air hole 14 and the slit 15 is desirably as small as possible. However, a shape finer than the sheet thickness of the electromagnetic steel sheet is difficult to form at the time of punching the electromagnetic steel sheet. Accordingly, the distance G1 between the air hole 14 and the slit 15 is set equal to or larger than the sheet thickness of the electromagnetic steel sheet of the rotor core 10, and smaller than two times the sheet thickness, so that the distance G1 is set as small as possible within a range in which punching is possible.

Figure 10:
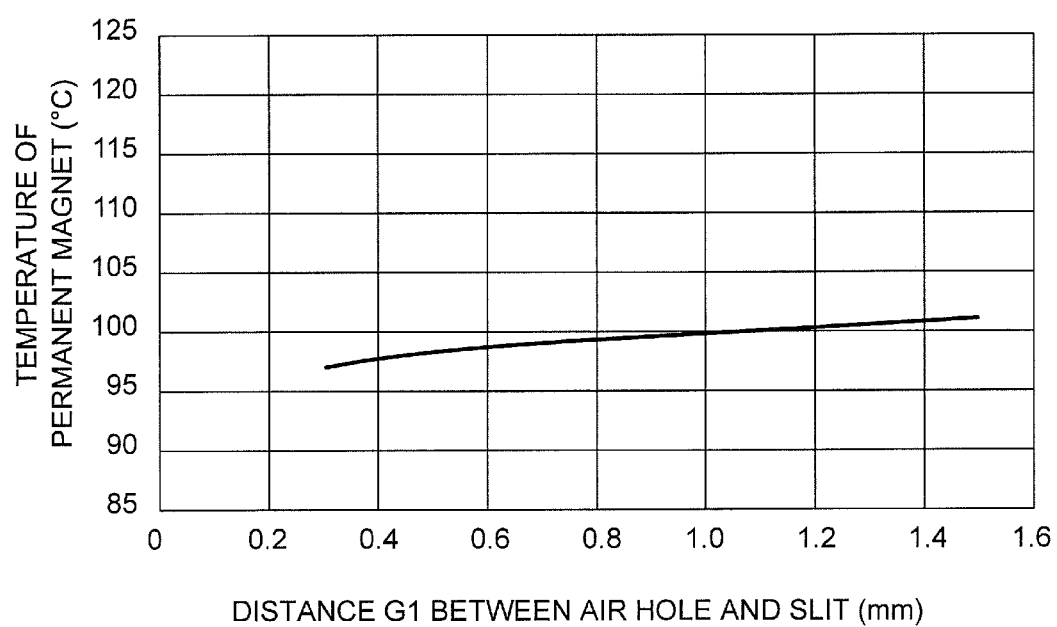
FIG. 10 is a graph illustrating a relationship between the temperature of the permanent magnet and a distance G1 from an air hole to a slit in the rotor according to the first embodiment.

FIG. 10 is a graph illustrating a relationship between the temperature of the permanent magnet 2 and the distance G1 between the air hole 14 and the slit 15. A horizontal axis indicates the distance G1 between the air hole 14 and the slit 15, and a vertical axis indicates the temperature of the permanent magnet 2.

From FIG. 10, it is understood that the temperature of the permanent magnet 2 decreases as the distance G1 between the air hole 14 and the slit 15 decreases. This is because the heat paths from the inner circumference 13 toward the outer circumference 19 of the rotor core 10 are narrowed as the distance G1 between the air hole 14 and the slit 15 decreases.

In particular, it is understood that, when the distance G1 between the air hole 14 and the slit 15 is smaller than 1.1 mm, the temperature of the permanent magnet 2 can be reduced to 100° C. or lower.

A rate of change (gradient) is more gradual in FIG. 10 than in FIG. 9. This is because of the following reasons. When the distance G1 between the air hole 14 and the slit 15 is set small, the heat path is narrowed only in one portion. In contrast, when the width S1 of the inter-slit portion 16 in the circumferential direction is set small as illustrated in FIG. 9, the narrow heat path (that is, the inter-slit portion 16) continues by the distance W2 in the radial direction, and thus the effect of inhibiting heat transmission to the magnet insertion hole 11 is high.

By summarizing the results showing in FIGS. 7 to 10, it is understood that the temperature of the permanent magnet 2 can reduced to 100° C. or lower when the following conditions are satisfied:

$W1/D1>0.95$, $W2/D1>0.95$, $S1<0.55$ mm, and $G1<1.1$ mm.

Hence, even in a state where the permanent magnet 2 contain no dysprosium or have dysprosium content of 2 wt % or less, and the rotor 1 is not mounted inside the stator 5 (that is, a state where the permeance of the permanent magnet 2 decreases), demagnetization of the permanent magnet 2 can be suppressed.

When the rivets 31 (FIG. 5) are inserted into the air holes 14, heat may be transmitted through the rivets 31 since the rivets 31 are made of metal. Therefore, in a configuration in which a plurality of air holes 14 face one magnet insertion hole 11, heat is readily transmitted to the magnet insertion holes 11. In the first embodiment, since the number of the air holes 14 is equal to the number of the magnet insertion holes 11, one air hole 14 faces one magnet insertion hole 11. Therefore, even when the rivets 31 are inserted into all of the air holes 14, less heat is transmitted to the magnet insertion holes 11, as compared to the configuration in which a plurality of air holes 14 face one magnet insertion hole 11.

When the number of the slits 15 is larger than the number of the poles (that is, the number of the magnet insertion holes 11), the number of the inter-slit portions 16 is also larger, and thus the number of the heat paths increases. In this embodiment, the number of the slits 15 is equal to the number of the poles, and thus the number of the inter-slit portions 16 as heat paths can be reduced. Therefore, less heat is transmitted to the magnet insertion holes 11.

In the facing portion 15c of the slit 15, the radius of curvature of the curved portion A1 including the inner end 21 and the radius of curvature of the curved portion A2 including the outer end 22 are desirably as small as possible, and more particularly they are desirably equal to or smaller than the sheet thickness of the electromagnetic steel sheet of the rotor core 10.

As the radii of curvatures of the curved portions A1 and A2 of the facing portion 15c of the slit 15 decrease, a proportion of the straight portion of each facing portion 15c increases. Accordingly, a proportion of a portion where the width S1 of the inter-slit portion 16 in the circumferential direction is minimum increases, and the heat paths from the inner circumference 13 toward the outer circumference 19 of the rotor core 10 are further narrowed.

The radius of curvature of each of the curved portions A1 and A2 of the facing portion 15c of the slit 15 is desirably equal to or smaller than the sheet thickness of the electromagnetic steel sheet. Further, the radius of curvature of each of the curved portions A1 and A2 of the facing portion 15c of the slit 15 is desirably large enough to prevent generation of punching die chippings at minimum, and more particularly 0.1 mm or more.

A temperature distribution occurs along the inner circumference 13 of the rotor core 10. In other words, while heat at the ends of the slit 15 in the circumferential direction is transmitted from the inter-slit portions 16 toward the outer circumference side, heat at a central portion of the slit 15 in the circumferential direction is less transmitted, and thus the temperatures is likely to be high at the central portion of the slit 15 in the circumferential direction.

In view of this, the opening portion 15d is provided at the central portion of the slit 15 in the circumferential direction to extend toward the magnet insertion hole 11. Thus, the width of the slit 15 in the radial direction is set locally large at the central portion in the circumferential direction. Hence, even when the temperature at the central portion of the slit 15 in the circumferential direction is high on the inner circumference 13 of the rotor core 10, less heat is transmitted to the magnet insertion holes 11.

In view of inhibiting heating of the permanent magnets 2, each of the slits 15 is desirably provided with the opening portion 15d. In the example illustrated in FIG. 2, one of the slits 15 (first slit) includes an opening portion 15d (first opening portion), and another one of the slits 15 (second slit) adjacent thereto in the circumferential direction includes an opening portion 15d (second opening portion).

The distance (minimum distance) D2 between the opening portion 15d and the magnet insertion hole 11 is desirably as small as possible. However, a shape finer than the sheet thickness of the electromagnetic steel sheet is difficult to form at the time of punching the electromagnetic steel sheet. Accordingly, the distance D2 between the opening portion 15d and the magnet insertion hole 11 is set equal to or larger than the sheet thickness of the electromagnetic steel sheet of the rotor core 10, and smaller than two times the sheet thickness, so that the distance D2 is set as small as possible within a range in which punching is possible.

In the rotor 1, when a distance from the axis C1 to the inner circumference 13 of the rotor core 10 (that is, the inner diameter of the shaft hole) is defined as a distance L1, and a minimum distance from the inner circumference 13 of the rotor core 10 to the magnet insertion hole 11 is defined as a distance L2, L1 is equal to or larger than L2 (that is, L1≥L2). In such a rotor 1, the distance from the inner circumference 13 to the magnet insertion hole 11 is small relative to the length of the inner circumference 13, and heat is readily transmitted to the magnet insertion hole 11, with the result that the permanent magnet 2 is readily heated.

Accordingly, by applying the configuration of the rotor 1 in the first embodiment to the rotor 1 satisfying L1 L2, more remarkable effect of suppressing demagnetization of the permanent magnets 2 can be obtained.

Effects of Embodiment

As described above, in the first embodiment of the present invention, the rotor core 10 includes the magnet insertion holes 11 (first magnet insertion hole and second magnet insertion hole) along the outer circumference 19 and adjacent to each other in the circumferential direction, and the plurality of slits 15 (first slit and second slit) along the inner circumference 13 and adjacent to each other in the circumferential direction. Each slit 15 includes the facing portions 15c (first facing portion and second facing portion) facing adjacent slits 15. The facing portions 15c include inner ends 21 (first inner end and second inner end) and outer ends 22 (first outer end and second outer end). The rotor core 10 includes the inter-slit portion 16 between the facing portions 15c (first facing portion and second facing portion) facing each other and defined by the straight line 23 connecting the inner ends 21 (first inner end and second inner end) to each other, and the straight line 24 connecting the outer ends 22 (first outer end and second outer end) to each other. The inter-slit portions 16 are disposed on the inner side in the radial direction of the inter-pole portions P2 between the adjacent magnet insertion holes 11. When D1 represents the minimum distance from the inner circumference 13 of the rotor core 10 to the slits 15 in the radial direction, W1 represents the minimum width of the slits 15 in the radial direction, and W2 represents the length of the inter-slit portion 16 in the radial direction, at least one of D1<W1 and D1<W2 is satisfied.

With this configuration, when D1<W1 is satisfied, the openings in the region between the inner circumference 13 of the rotor core 10 and the magnet insertion hole 11 can be made larger, and when D1<W2 is satisfied, the heat paths from the inner circumference 13 toward the outer circumference 19 can be lengthened. In both cases, when the shaft 3 is fitted into the shaft hole of the rotor core 10 by shrink fitting, less heat is transmitted to the magnet insertion holes 11, and heating of the permanent magnets 2 can thus be inhibited. This makes it possible to suppress demagnetization of the permanent magnets 2 due to heat, and to enhance performance.

When both of D1<W1 and D1<W2 are satisfied, it is possible to effectively inhibit heat transmission to the magnet insertion holes 11 and to enhance the effect of inhibiting heating of the permanent magnets 2.

Since the width (minimum width) S1 of the inter-slit portion 16 in the circumferential direction is equal to or larger than the sheet thickness of the electromagnetic steel sheet of the rotor core 10, and is smaller than two times the sheet thickness, the heat paths from the inner circumference 13 toward the outer circumference 19 of the rotor core 10 can be narrowed. Therefore, less heat is transmitted to the magnet insertion holes 11, and thus the effect of inhibiting heating of the permanent magnets 2 can be enhanced.

The opening portions 15d (first opening portion and second opening portion) are formed to extend from the central portions of the slits 15 (first slit and second slit) in the circumferential direction toward the magnet insertion holes 11. Therefore, even when the central portions of the slits 15 in the circumferential direction are heated to the highest temperature on the inner circumference 13 of the rotor core 10, less heat is transmitted to the magnet insertion holes 11, and thus the effect of inhibiting heating of the permanent magnets 2 can be enhanced.

Since the distance between the magnet insertion hole 11 and the opening portion 15d is equal to or larger than the sheet thickness of the electromagnetic steel sheet of the rotor core 10, further less heat is transmitted to the magnet insertion hole 11.

In the rotor core 10, since the air holes 14 are disposed on the outer side of the slits 15 in the radial direction, both of the distance D1 from the inner circumference 13 of the rotor core 10 to the slit 15 in the radial direction, and the width S1 of the inter-slit portion 16 in the circumferential direction can be set smaller as compared to the case where the air holes 14 are formed in the inter-slit portions 16 or formed on the inner side of the slits 15 in the radial direction.

Since the air hole 14 is disposed on the inner side of the inter-pole portion P2 in the radial direction, the heat path is defined between the slit 15 and the air hole 14, and thus the heat path from the inner circumference 13 toward the outer circumference 19 of the rotor core 10 can be narrowed.

Since the distance (minimum distance) G1 from the air hole 14 to the slit 15 is equal to or larger than the sheet thickness of the electromagnetic steel sheet of the rotor core 10, and is smaller than two times the sheet thickness, the heat paths can further be narrowed.

Since the number of the magnet insertion holes 11 (that is, the number of the inter-pole portions P2) is equal to the number of the air holes 14, one air hole 14 faces one magnet insertion hole 11. Thus, even when the rivets 31 are inserted into all of the air holes 14, less heat is transmitted to the magnet insertion holes 11, as compared to the configuration in which a plurality of air holes 14 face one magnet insertion hole 11.

Since the number of the slits 15 is equal to the number of the magnet insertion holes 11, the number of the inter-slit portions 16 serving as the heat paths can be reduced as compared to a configuration in which the number of the slits 15 is larger than the number of the magnet insertion holes 11. Thus, less heat is transmitted to the magnet insertion holes 11, and weight balance of the rotor 1 can be enhanced.

When the distance L1 from the axis C1 to the inner circumference 13 of the rotor core 10 is equal to or smaller than the distance (minimum distance) L2 from the inner circumference 13 to the magnet insertion hole 11, the distance L2 from the inner circumference 13 to the magnet insertion hole 11 is small relative to the length of the inner circumference 13, and thus heat is readily transmitted to the magnet insertion holes 11. Therefore, by employing the configuration of the rotor 1 in the first embodiment, it is possible to obtain more remarkable effect of suppressing demagnetization of the permanent magnets 2 due to heat.

In each of the facing portions 15c (first facing portion and second facing portion) defining both sides of the inter-slit portion 16, the radii of curvatures of the curved portion A1 including the inner end 21 and the curved portion A2 including the outer end 22 are equal to or smaller than the sheet thickness of the electromagnetic steel sheet, and thus the straight portion accounts for a large proportion of the facing portion 15c. Hence, a part in which the width S1 of the inter-slit portion 16 in the circumferential direction is the minimum increases, and thus the heat path from the inner circumference 13 toward the outer circumference 19 of the rotor core 10 can further be narrowed.

Second Embodiment

Figure 11:
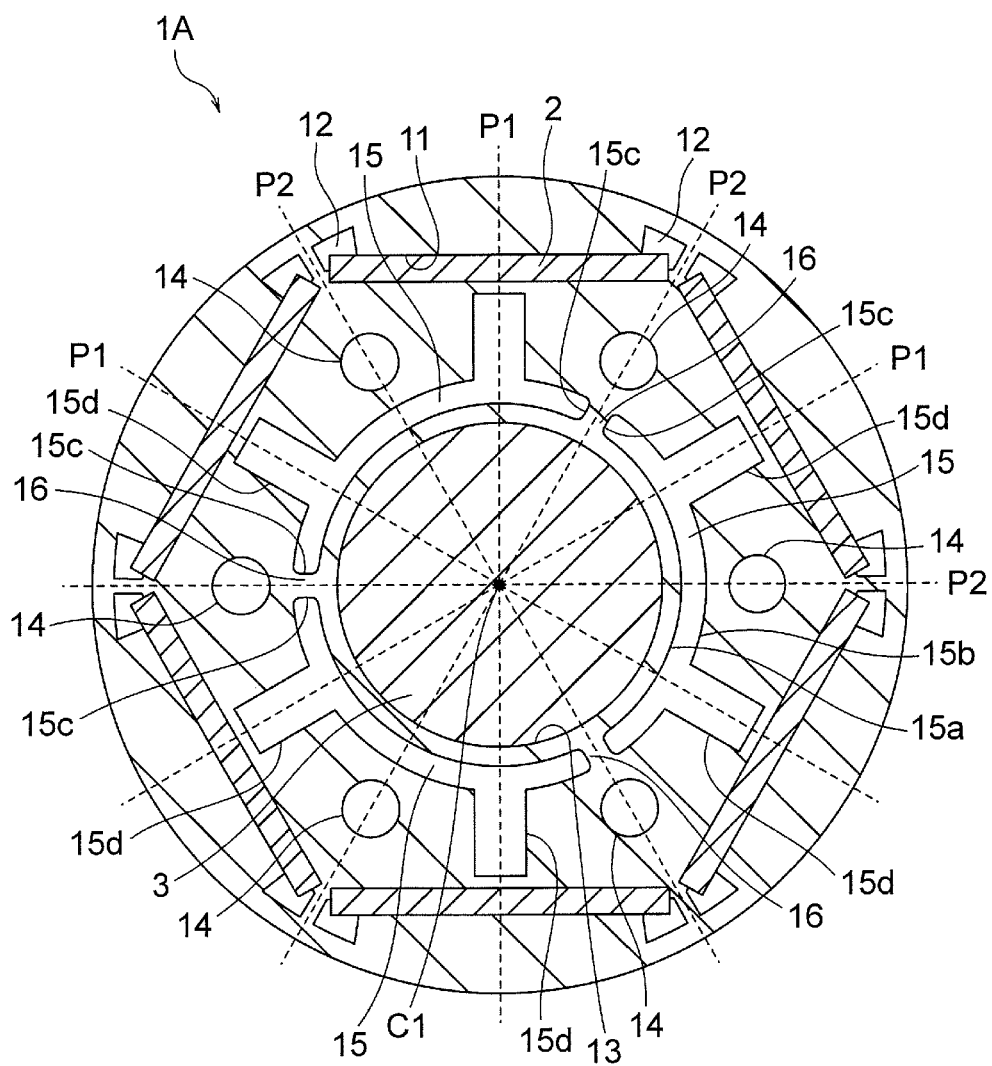
FIG. 11 is a cross sectional view illustrating a rotor according to a second embodiment.

Next, a second embodiment of the present invention will be described. FIG. 11 is a cross sectional view illustrating a rotor 1A according to the second embodiment. In the rotor 1 in the above described first embodiment, the number of the slits 15 is equal to the number of the magnet insertion holes 11 (that is, the number of the poles). In contrast, in the rotor 1A in the second embodiment, the number of the slits 15 is smaller than the number of the magnet insertion holes 11.

More specifically, in the rotor 1A in the second embodiment, the number of the slits 15 is set to a number obtained by dividing the number of the magnet insertion holes 11 by a natural number N. In the example illustrated in FIG. 11, the number of the magnet insertion holes 11 (that is, the number of the poles) is 6, and the number of the slits 15 is 3. In other words, N=2. In contrast, the first embodiment corresponds to a case in which N=1.

More specifically, one slit 15 is formed in correspondence with two magnet insertion holes 11 adjacent to each other in the circumferential direction. The number of the inter-slit portions 16 formed between adjacent slits 15 is 3. In other words, the inter-slit portions 16 are formed at positions corresponding to three of six inter-pole portions P2, and the slits 15 are formed at positions corresponding to the remaining three inter-pole portions P2.

With this configuration, the number of the heat paths from the inner circumference 13 toward the outer circumference 19 of the rotor core 10 decreases. As a result, further less heat is transmitted to the magnet insertion holes 11, and thus heating of the permanent magnets 2 can be effectively inhibited. Since the number of the slits 15 is set to the number obtained by dividing the number of the magnet insertion holes 11 by the natural number N, the weight balance of the rotor 1A is good so that vibration of the motor 100 can be suppressed.

The air hole 14 is disposed on the outer side of the inter-slit portion 16 in the radial direction (that is, on the inner side of the inter-pole portions P2 in the radial direction). The heat path is defined in the portion between the slit 15 and the air hole 14, and therefore can be narrowed. The air hole 14 is also disposed on the inner side of the inter-pole portion P2 in the radial direction, and on the outer side of the slit 15 in the radial direction.

The slit 15 is desirably provided with the opening portion 15d extending toward the magnet insertion hole 11. In the example illustrated in FIG. 11, two opening portions 15d extend from one slit 15 toward respective central portions of two magnet insertion holes 11 in the circumferential direction. The distance between the magnet insertion hole 11 and the opening portion 15d is equal to or larger than the sheet thickness of the electromagnetic steel sheet of the rotor core 10, and is smaller than two times the sheet thickness, as described in the first embodiment.

The motor in the second embodiment is configured in the same manner as the motor in the first embodiment, except for the number and the shape of the slits 15 of the rotor 1A.

In this case, three slits 15 are provided for six magnet insertion holes 11, but the number of the magnet insertion holes 11 and the number of the slits 15 are not limited to these numbers. It is sufficient that the number of the slits 15 equals to a number obtained by dividing the number of the magnet insertion holes 11 (that is, the number of the poles) by the natural number N.

As described above, in the second embodiment, the number (second number) of the slits 15 is smaller than the number (first number) of the magnet insertion holes 11, and is set to the number obtained by dividing the number of the magnet insertion holes 11 by the natural number N, the heat paths from the inner circumference 13 toward the outer circumference 19 of the rotor core 10 are reduced. Therefore, less heat is transmitted to the magnet insertion holes 11, and thus the effect of inhibiting heating of the permanent magnets 2 can be enhanced.

Third Embodiment

Figure 12:
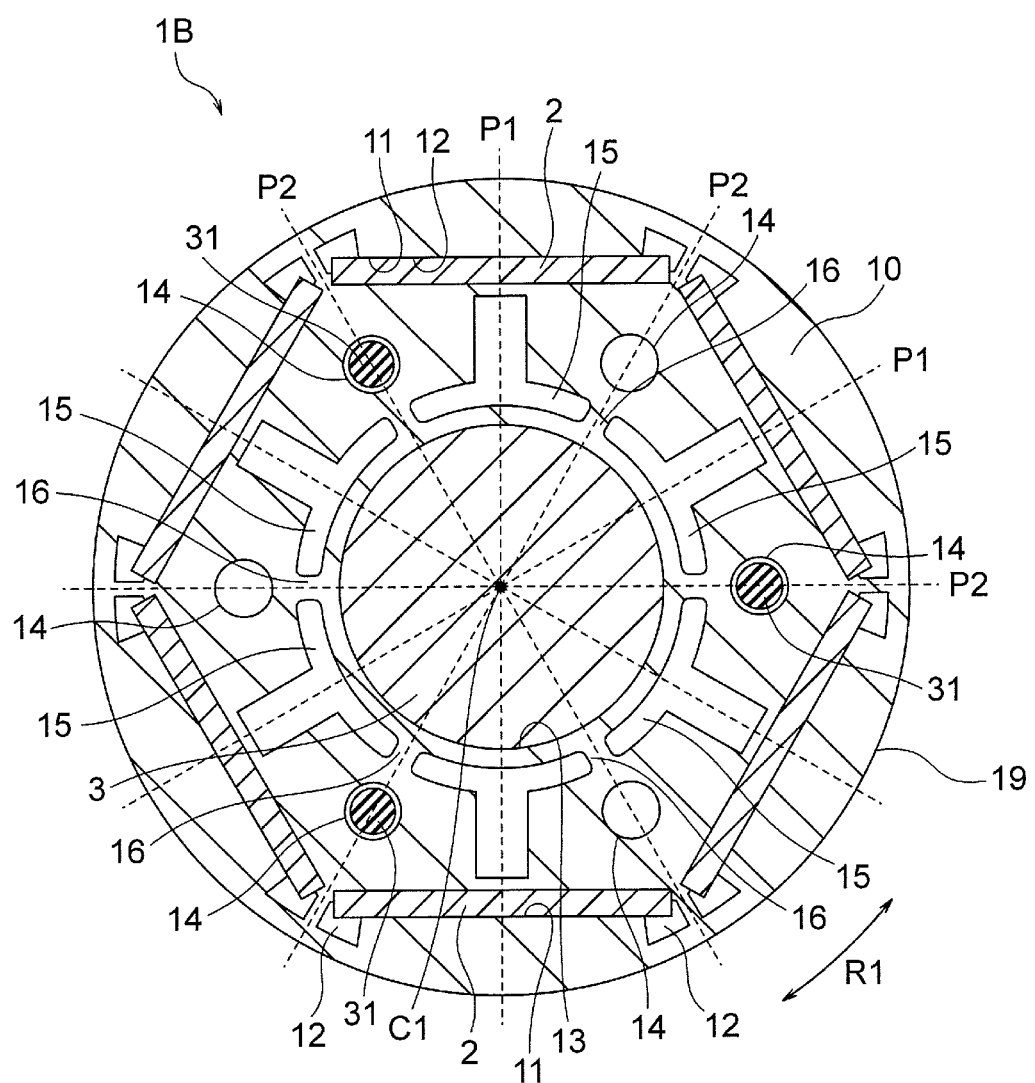
FIG. 12 is a cross sectional view illustrating a rotor according to a third embodiment.

Next, a third embodiment of the present invention will be described. FIG. 12 is a cross sectional view illustrating a rotor 1B according to the third embodiment. In the third embodiment, the number of the rivets 31 inserted into the air holes 14 of the rotor 1B is equal to or smaller than a half of the number of the magnet insertion holes 11 (that is, the number of the poles).

As illustrated in FIG. 12, the rotor core 10 of the rotor 1B includes six magnet insertion holes 11 along the outer circumference 19, and six slits 15 along the inner circumference 13. The air holes 14 are formed on the outer side of the inter-slit portions 16 between adjacent slits 15 in the radial direction (formed at positions corresponding to the inter-pole portions P2).

The number of the air holes 14 is equal to the number (first number) of the magnet insertion holes 11, and is 6 in this example. The rivets 31 are inserted in three air holes 14 among the six air holes 14. The number of the air holes 14 into which the rivets 31 are inserted equals to a half of the number of the magnet insertion holes 11. The air holes 14 in which the rivets 31 are inserted, and the air holes 14 in which no rivet 31 is inserted are alternately arranged in the circumferential direction. In other words, the rivet 31 is not inserted in one of the two air holes 14 located on both sides (inter-pole portions P2) of each magnet insertion hole 11 in the circumferential direction.

The rivets 31 are made of metal and therefore act as heat paths. Therefore, if the rivets 31 are inserted into all of the air holes 14, the number of the heat paths from the inner circumference 13 toward the outer circumference 19 increases, and thus heat may readily be transmitted to the magnet insertion holes 11.

In view of this, in the third embodiment, the number of the rivets 31 is set equal to or smaller than a half of the number of the magnet insertion holes 11. Furthermore, no rivet 31 is inserted in at least one of the two air holes 14 located on both sides (inter-pole portions P2) of each magnet insertion hole 11 in the circumferential direction. Thus, heat is inhibited from being transmitted to the magnet insertion hole 11 from both sides in the circumferential direction.

The motor in the third embodiment is configured in the same manner as the motor in the first embodiment, except for the number of the air holes 14 of the rotor 1B into which the rivets 31 are inserted.

In this example, the rivets 31 are inserted into three of the six air holes 14 of the rotor core 10, but this embodiment is not limited to these numbers. It is sufficient that the number (third number) of the air holes 14 into which the rivets 31 are inserted is equal to or smaller than a half of the number (first number) of the magnet insertion holes 11.

As described above, in the third embodiment, the rivets 31 are inserted into the air holes 14, the number of which is equal to or smaller than a half of the number (first number) of the magnet insertion holes 11, among a plurality (third number) of the air holes 14 formed in the rotor core 10. Therefore, heat can be inhibited from being transmitted to the magnet insertion holes 11 through the rivets 31. Thus, the effect of inhibiting heating of the permanent magnets 2 can be enhanced.

In the third embodiment, the configuration in which the number of the slits 15 is fewer than the number of the magnet insertion holes 11 (the number of the poles) as described in the second embodiment may be employed.

Fourth Embodiment

Figure 13:
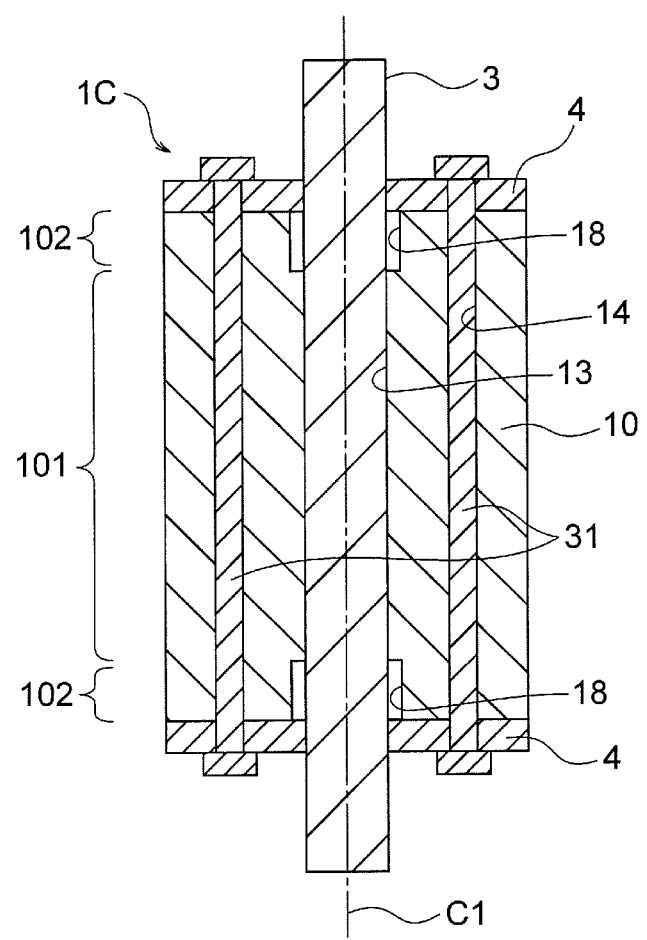
FIG. 13 is a longitudinal sectional view illustrating a rotor according to a fourth embodiment.

Next, a fourth embodiment of the present invention will be described. FIG. 13 is a longitudinal sectional view illustrating a rotor 1C of a motor according to the fourth embodiment. The rotor 1 in the above described first embodiment is formed by a stacked body of the electromagnetic steel sheets 101 of one type (FIG. 5). In contrast, the rotor 1C in the fourth embodiment is formed by a stacked body of electromagnetic steel sheets 101 and 102 of two types.

More specifically, in the rotor 1C in the fourth embodiment, the electromagnetic steel sheets 101 and 102 are stacked in the axial direction and fastened together by crimping or the like. The electromagnetic steel sheets 102 are disposed at both ends of the rotor 1C in the axial direction, and the electromagnetic steel sheets 101 are disposed at a central portion of the rotor 1C in the axial direction. The electromagnetic steel sheet 101 has the same structure as the electromagnetic steel sheet of the rotor 1 in the first embodiment. In contrast, the electromagnetic steel sheet 102 has an inner diameter larger than the outer diameter of the shaft 3. In other words, the inner circumference 18 of the electromagnetic steel sheet 102 is distanced from the outer circumference of the shaft 3 outward in the radial direction.

Figure 14:
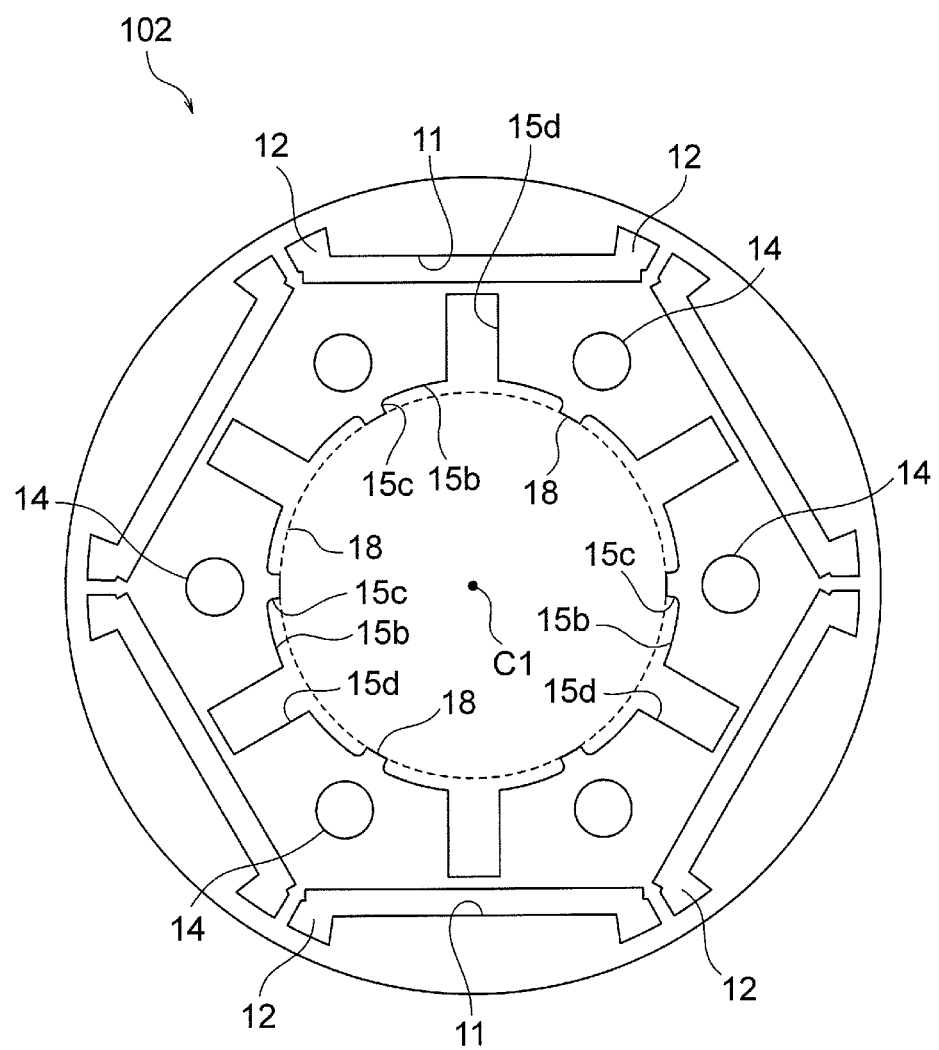
FIG. 14 is a cross sectional view illustrating the rotor according to the fourth embodiment.

FIG. 14 is a plan view illustrating the electromagnetic steel sheet 102. The inner circumference 18 of the electromagnetic steel sheet 102 is obtained by expanding the inner circumference 13 (FIG. 3) of the electromagnetic steel sheet 101 of the rotor 1 in the first embodiment outward in the radial direction. In this example, the inner circumference 18 of the electromagnetic steel sheet 102 is formed on the outer side of the inner circumferential edges 15a (FIG. 3), which are radially innermost portion, of the slits 15 in the radial direction. Therefore, the electromagnetic steel sheet 102 includes the outer circumferential edges 15b and the opening portions 15d and part of the facing portions 15c of the slits 15, but does not include the inner circumferential edges 15a (FIG. 3).

The inner circumference 18 of the electromagnetic steel sheet 102 is distanced from the outer circumference of the shaft 3 outward in the radial direction, and therefore need not be heated in the shrink fitting of the shaft 3. In other words, in the shrink fitting of the shaft 3, the inner circumference 13 of the electromagnetic steel sheet 101 of the rotor core 10 is intensively heated (by induction heating).

When the inner circumference 13 of the electromagnetic steel sheet 101 is heated by, for example, an induction heater, the inner circumference 18 of the electromagnetic steel sheet 102 is less heated since the inner circumference 18 is retracted outward with respect to the inner circumference 13 of the electromagnetic steel sheet 101 in the radial direction. Therefore, the amount of heat transmitted from the inner circumference 18 to the magnet insertion holes 11 of the electromagnetic steel sheet 102 decreases, and thus the effect of inhibiting heating of the permanent magnets 2 can be enhanced.

Even when a clearance is present between the shaft 3 and the inner circumference 18 of the electromagnetic steel sheet 102, the shaft 3 is fitted into the inner circumference 13 of the electromagnetic steel sheet 101 by shrink fitting, and thus a sufficient frictional force can be obtained between the shaft 3 and the rotor core 10. In other words, the rotor core 10 can be tightly fixed to the shaft 3.

When the inner diameter of the shaft hole of the rotor core 10 is larger, a frictional force between the shaft 3 and the rotor core 10 can more easily be obtained. Thus, in such a rotor core 10, the proportion of the electromagnetic steel sheets 102 can be increased.

In the case where the electromagnetic steel sheet 102 is disposed at least at one end of the rotor 1C in the stacking direction, an inlet side of the shaft hole has a large inner diameter when the shaft 3 is inserted into the shaft hole of the rotor 1C, and thus insertion of the shaft 3 is facilitated.

In the case where the electromagnetic steel sheets 102 are disposed at both ends of the rotor 1C in the stacking direction, the inlet side of the shaft hole has a larger inner diameter when the shaft 3 is inserted into the shaft hole of the rotor 1C from either end in the axial direction, and thus insertion of the shaft 3 is facilitated. Therefore, workability is enhanced.

The motor in the fourth embodiment is configured in the same manner as the motor in the first embodiment, except that the rotor 1C includes the electromagnetic steel sheets 102.

In the example illustrated in FIG. 14, the inner circumference 18 of the electromagnetic steel sheet 102 is formed at a position corresponding to the slits 15 (FIG. 3), but it is sufficient that the inner circumference 18 is formed at a position distanced from the outer circumference of the shaft 3 outward in the radial direction.

As described above, in the fourth embodiment, since the rotor core 10 includes the electromagnetic steel sheet 102 having the inner diameter larger than the outer diameter of the shaft 3, less heat is transmitted from the electromagnetic steel sheets 102 to the permanent magnets 2. Thus, the effect of inhibiting heating of the permanent magnets 2 can be enhanced.

Since the shaft 3 is fitted into the inner circumference 13 of the electromagnetic steel sheet 101 by shrink fitting, a sufficient frictional force between the shaft 3 and the rotor core 10 can be obtained, and the rotor core 10 can be tightly fixed to the shaft 3.

In the case where the electromagnetic steel sheet 102 is disposed at least at one end of the rotor 1C in the stacking direction, the shaft 3 can easily be inserted into the shaft hole of the rotor 1C. Further, in the case where the electromagnetic steel sheets 102 are disposed at both ends of the rotor 1C in the stacking direction, and thus workability is further enhanced.

In the fourth embodiment, the configuration in which the number of the slits 15 is fewer than the number of the magnet insertion holes 11 (the number of the poles) as described in the second embodiment may be employed, or the configuration in which the rivets 31 are inserted into the air holes 14 whose number is equal to or smaller than a half of the number of the poles as described in the third embodiment may be employed.

Fifth Embodiment

Figure 15:
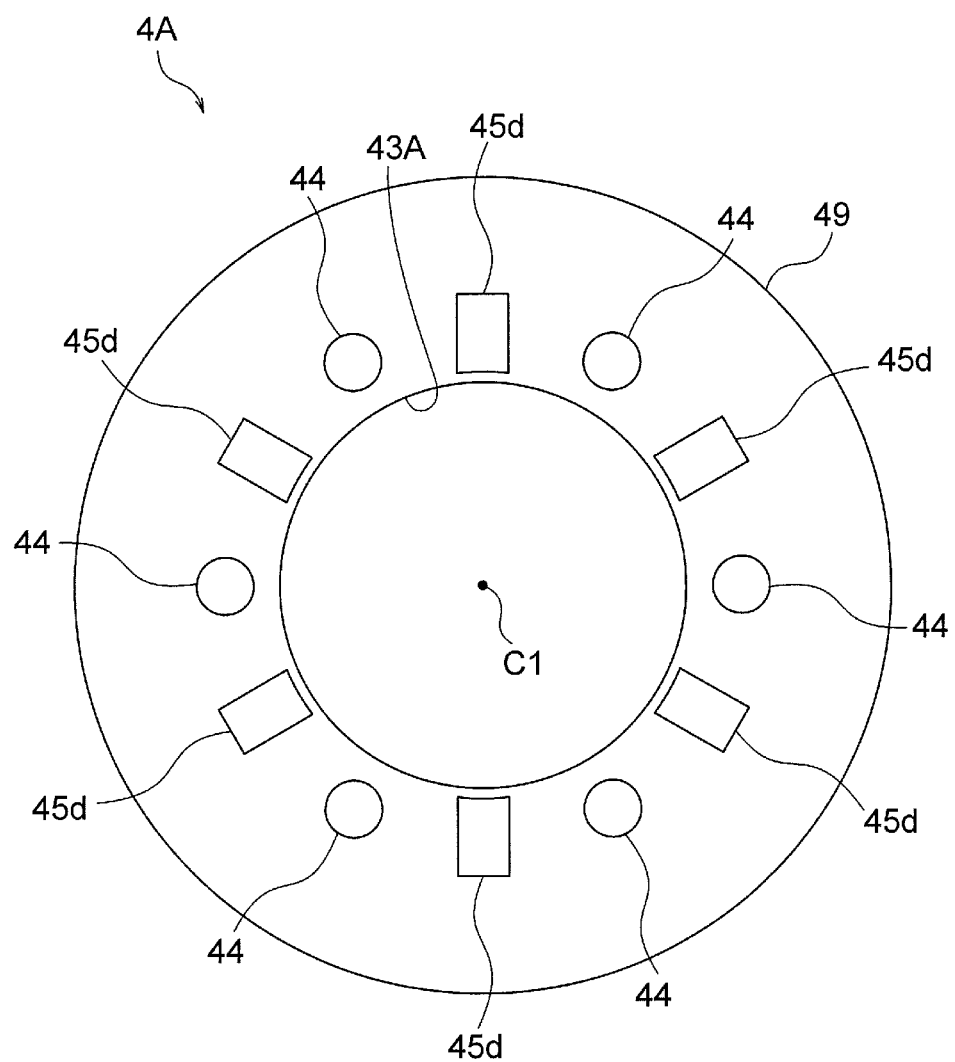
FIG. 15 is a plan view illustrating an end plate of a rotor according to a fifth embodiment.

Next, a fifth embodiment of the present invention will be described. FIG. 15 is a plan view illustrating an end plate 4A of a rotor according to the fifth embodiment. The end plate 4 (FIG. 6) described in the first embodiment has the inner circumference 43 at a position corresponding to the inner circumference 13 (FIG. 3) of the rotor core 10, and includes the slits 45 corresponding to the slits 15 of the rotor core 10 along the inner circumference 43.

In contrast, an inner circumference 43A of the end plate 4A illustrated in FIG. 15 is formed along the slits 15 (FIG. 3) of the rotor core 10. More specifically, the inner circumference 43A of the end plate 4A is formed on the outer side, in the radial direction, of the inner circumferential edges 15a (FIG. 3), which are radially innermost portions, of the slits 15 of the rotor core 10. In this example, the inner circumference 43A of the end plate 4A is formed at a position corresponding to outer circumferential edges 15b of the slits 15.

The end plate 4A further includes a plurality of air holes 44 and a plurality of opening portions 45d along the inner circumference 43A. The air holes 44 of the end plate 4A are formed at positions corresponding to the air holes 14 (FIG. 3) of the rotor core 10. The opening portions 45d of the end plate 4A are formed at positions corresponding to the opening portions 15d (FIG. 3) of the rotor core 10.

The end plate 4A is disposed at each end of the rotor core 10 in the axial direction, and functions to prevent the permanent magnets 2 from falling out of the magnet insertion holes 11, as is the case with the end plate 4 in the first embodiment. Therefore, even when the inner circumference 43A of the end plate 4A is distanced from the outer circumference of the shaft 3 outward in the radial direction, the function of the end plate 4A is not affected.

The inner circumference 43A of the end plate 4A is distanced from the outer circumference of the shaft 3 outward in the radial direction, and therefore the inner circumference 43A of the end plate 4A is less heated during shrink fitting of the shaft 3. Thus, heat is inhibited from being transmitted to the permanent magnets 2 through the end plates 4A.

Since the end plate 4A includes the air holes 44 at positions corresponding to the air holes 14 (FIG. 3) of the rotor core 10, passage of a fluid (for example, air or refrigerant) through the air holes 14 of the rotor core 10 or insertion of the rivets 31 is possible. Since the end plate 4A also includes the opening portions 45d at positions corresponding to the opening portions 15d (FIG. 3) of the rotor core 10, less heat is transmitted to the permanent magnets 2 through the end plates 4A.

The motor in the fifth embodiment is configured in the same manner as the motor in the first embodiment, except for the structure of the end plate 4A of the rotor.

The end plate 4A is disposed at each end of the rotor core 10 in the axial direction, but the end plate 4A may be disposed only at one end of the rotor core 10 in the axial direction, and the end plate 4 (FIG. 6) in the first embodiment may be disposed at the other end of the rotor core 10 in the axial direction.

Figure 16:
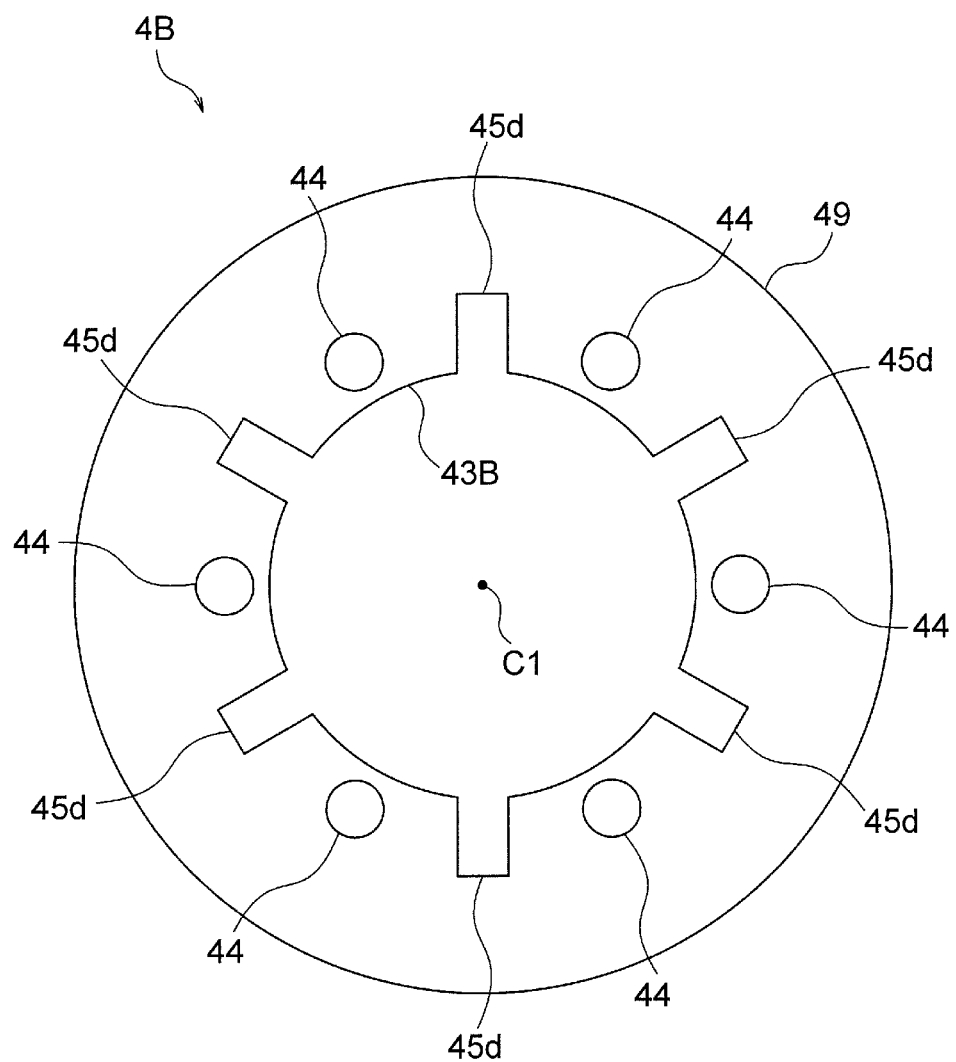
FIG. 16 is a plan view illustrating an end plate of a rotor according to a modification of the fifth embodiment.

FIG. 16 is a plan view illustrating an end plate 4B of a rotor according to a modification of the fifth embodiment. An inner circumference 43B of the end plate 4B illustrated in FIG. 16 is formed at a more outer side in the radial direction than the inner circumference 43A of the end plate 4A illustrated in FIG. 15, and is connected to the opening portions 45d. Since the inner circumference 43B of the end plate 4B is formed on the outer side in the radial direction in this manner, the inner circumference 43B is heated further less during the shrink fitting of the shaft 3, and thus heat can be effectively inhibited from being transmitted to the permanent magnets 2 through the end plate 4B.

As described above, in the fifth embodiment, since the inner circumferences 43A and 43B of the end plates 4A and 4B are formed along the slits 15 of the rotor core 10, heat can be inhibited from being transmitted to the permanent magnets 2 through the end plates 4A and 4B, without deteriorating the function of the end plates 4A and 4B. Thus, the effect of inhibiting heating of the permanent magnets 2 can be enhanced.

In particular, since the inner circumferences 43A and 43B of the end plates 4A and 4B are positioned on the outer side of the inner circumferential edges 15a of the slits 15 of the rotor core 10 in the radial direction, the end plates 4A and 4B are less heated during the shrink fitting of the shaft 3, and thus the effect of inhibiting heating of the permanent magnets 2 can be enhanced.

The inner circumferences 43A and 43B of the end plates 4A and 4B annularly extend in FIGS. 15 and 16, but this embodiment is not limited to this shape. The inner circumferences 43A and 43B may extend in, for example, a polygonal shape as long as the inner circumferences 43A and 43B are positioned on the outer side of the inner circumference 13 of the rotor core 10 in the radial direction.

In the fifth embodiment, the configuration in which the number of the slits 15 is fewer than the number of the magnet insertion holes 11 (the number of the poles) as described in the second embodiment may be employed, or the configuration in which the rivets 31 are inserted into the air holes 14 whose number is equal to or smaller than a half of the number of the poles as described in the third embodiment may be employed. The configuration in which the rotor core 10 includes the electromagnetic steel sheet 102 having the inner circumference 18 distanced from the shaft 3 as described in the fourth embodiment may be employed.

(Rotary Compressor)

Figure 17:
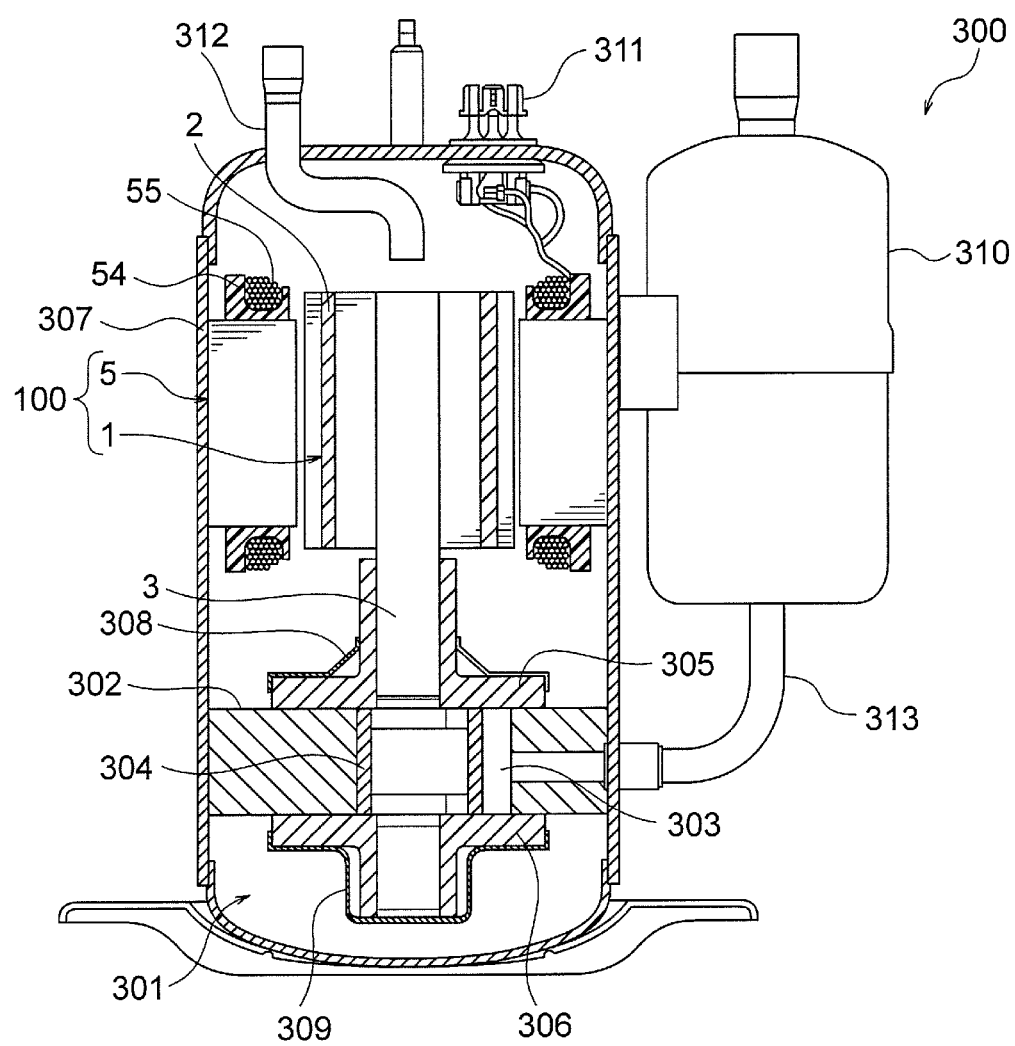
FIG. 17 is a longitudinal sectional view illustrating a rotary compressor to which the motor according to each of the embodiments is applicable.

Next, a rotary compressor 300 to which the motor 100 in each of the first to fifth embodiments is applicable will be described. FIG. 17 is a longitudinal sectional view illustrating a configuration of the rotary compressor 300. The rotary compressor 300 is used in, for example, an air conditioning apparatus, and includes a closed container 307, a compression element 301 disposed in the closed container 307, and the motor 100 for driving the compression element 301.

The compression element 301 includes a cylinder 302 having a cylinder chamber 303, a shaft 3 rotated by the motor 100, a rolling piston 304 fixed to the shaft 3, a vane (not illustrated) separating the cylinder chamber 303 into a suction side and a compression side, and an upper frame 305 and a lower frame 306 through which the shaft 3 is inserted. The upper frame 305 and the lower frame 306 close end faces of the cylinder chamber 303 in the axial direction. An upper discharge muffler 308 and a lower discharge muffler 309 are mounted on the upper frame 305 and the lower frame 306, respectively.

The closed container 307 is a cylindrical container. Refrigerating oil (not illustrated) for lubricate sliding portions of the compression element 301 is stored at a bottom of the closed container 307. The shaft 3 is rotatably held by the upper frame 305 and the lower frame 306 serving as bearing portions.

The cylinder 302 has the cylinder chamber 303 therein, and the rolling piston 304 rotates eccentrically in the cylinder chamber 303. The shaft 3 includes an eccentric shaft portion, and the rolling piston 304 is fitted to the eccentric shaft portion.

The stator 5 of the motor 100 is mounted inside a frame of the closed container 307 by a method such as shrink fitting, press fitting, or welding. Electric power is supplied to the coils 55 of the stator 5 from a glass terminal 311 fixed to the closed container 307. The shaft 3 is fixed to the shaft hole formed at the center of the rotor core 10 (FIG. 2) of the rotor 1.

An accumulator 310 for storing refrigerant gas is attached outside the closed container 307. A suction pipe 313 is fixed to the closed container 307, and the refrigerant gas is supplied from the accumulator 310 to the cylinder 302 via the suction pipe 313. A discharge pipe 312 for discharging the refrigerant outside is provided in an upper portion of the closed container 307.

The refrigerant gas supplied from the accumulator 310 is supplied to the cylinder chamber 303 of the cylinder 302 through the suction pipe 313. When the rotor 1 rotates as the motor 100 is driven by current supplied by the inverter, the shaft 3 rotates together with the rotor 1. The rolling piston 304 fitted to the shaft 3 eccentrically rotates in the cylinder chamber 303 to compress the refrigerant in the cylinder chamber 303. The refrigerant compressed in the cylinder chamber 303 passes through the discharge mufflers 308 and 309, further passes through the air holes 14 or the like (FIG. 2) of the rotor core 10, and ascends in the closed container 307. The refrigerant ascended in the closed container 307 is discharged from the discharge pipe 312 and supplied to a high-pressure side of a refrigeration cycle.

The motor 100 in each of above described first to fifth embodiments suppresses demagnetization of the permanent magnets 2 due to heat to thereby suppress reduction in magnetic flux of the permanent magnets 2, and to enhance motor efficiency and increase output. Hence, by applying the motor 100 to the rotary compressor 300, operating efficiency of the rotary compressor 300 can be enhanced and output can be increased.

The motor 100 in each of the first to fifth embodiments is not limited to use in the rotary compressor 300, and can be used in other types of compressors.

(Refrigeration Cycle Apparatus)

Figure 18:
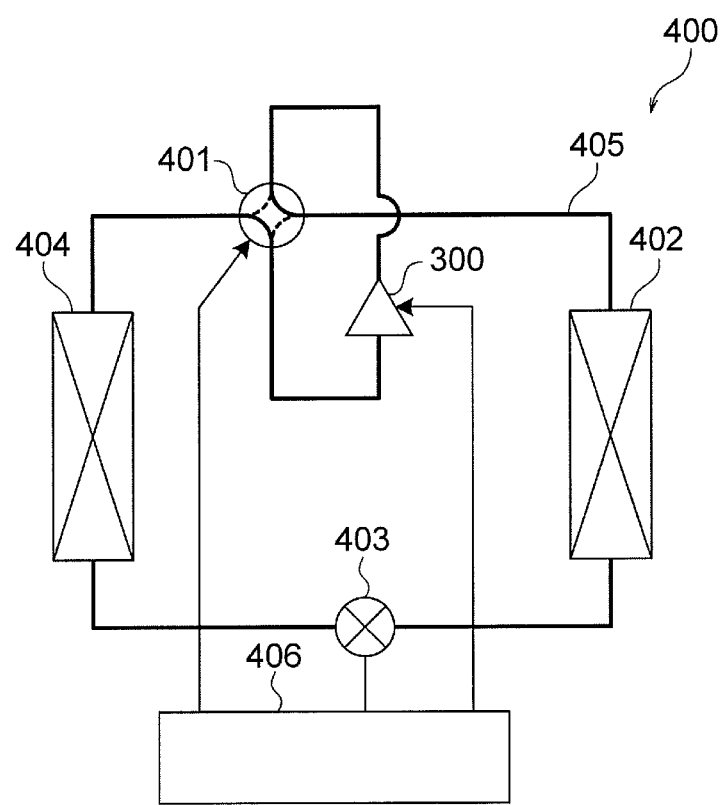
FIG. 18 is a diagram illustrating a refrigeration cycle apparatus including the compressor illustrated in FIG. 17.

Next, a refrigeration cycle apparatus 400 (air conditioning apparatus) including the rotary compressor 300 will be described. FIG. 18 is a diagram illustrating a configuration of the refrigeration cycle apparatus 400. The refrigeration cycle apparatus 400 includes a compressor (rotary compressor) 300, a four-way valve 401, a condenser 402, a decompressor (expander) 403, an evaporator 404, a refrigerant pipe 405, and a controller 406. The compressor 300, the condenser 402, the decompressor 403, and the evaporator 404 are connected to each other via the refrigerant pipe 405 to form a refrigeration cycle.

An operation of the refrigeration cycle apparatus 400 is as follows. The compressor 300 compresses suctioned refrigerant and discharges it as high-temperature, high-pressure gas refrigerant. The four-way valve 401 is provided for switching a flow direction of the refrigerant, and guides the refrigerant discharged from the compressor 300 to the condenser 402 in a state illustrated in FIG. 18. The condenser 402 exchanges heat between the refrigerant discharged from the compressor 300 and air (for example, outdoor air) to condense and liquefy the refrigerant, and discharges the liquid refrigerant. The decompressor 403 expands the liquid refrigerant discharged from the condenser 402 and discharges it as low-temperature, low-pressure liquid refrigerant.

The evaporator 404 exchanges heat between the low-temperature, low-pressure liquid refrigerant discharged from the decompressor 403 and air (for example, indoor air) to make the refrigerant deprive the air of heat and evaporate (vaporize) the refrigerant, and discharges it as gas refrigerant. The air deprived of heat in the evaporator 404 is supplied to a target space (for example, an indoor space) by a fan (not illustrated). Operations of the four-way valve 401 and the compressor 300 are controlled by the controller 406.

In the compressor 300 of the refrigeration cycle apparatus 400, the motor 100 in each of the above described first to fifth embodiments can be employed to thereby enhance operating efficiency. Hence, energy efficiency of the refrigeration cycle apparatus 400 can be enhanced.

(Air Conditioning Apparatus)

Figure 19:
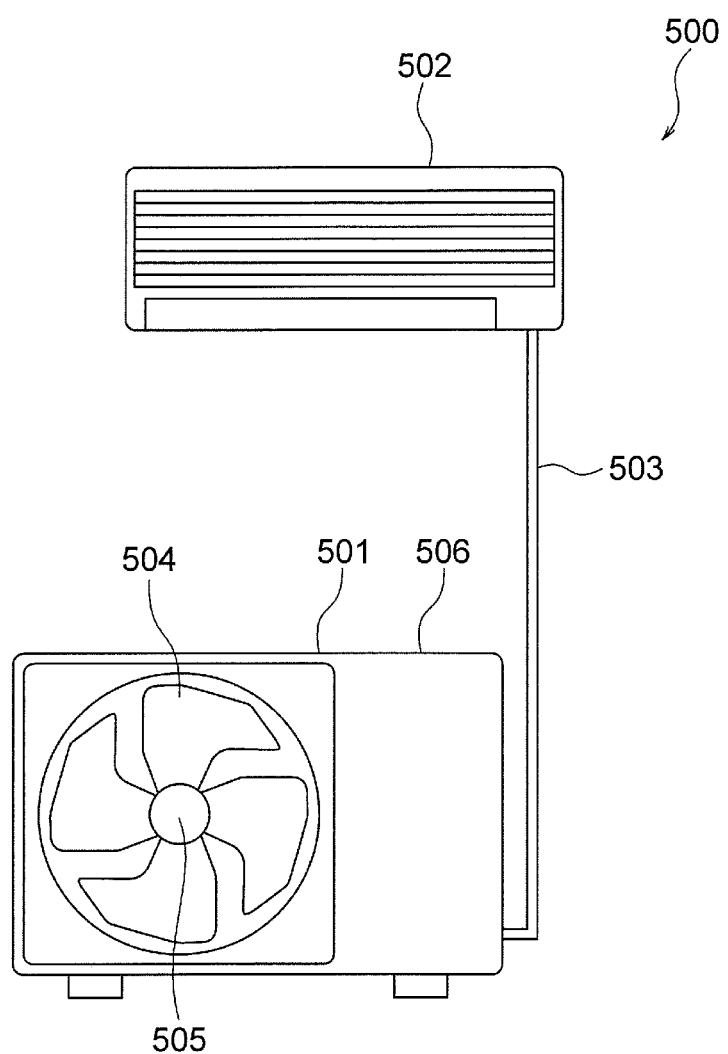
FIG. 19 is a diagram illustrating an air conditioning apparatus including a fan to which the motor according to each of the embodiments is applicable.

Next, an air conditioning apparatus to which the motor in each of the above described embodiments is applied will be described. FIG. 19 is a diagram illustrating a configuration of an air conditioning apparatus 500 to which the motor 100 in each of the first to fifth embodiments is applicable. The air conditioning apparatus 500 includes an outdoor unit 501, an indoor unit 502, and a refrigerant pipe 503 connecting these units. The outdoor unit 501 includes an outdoor fan 505 as a fan.

Figure 20A:
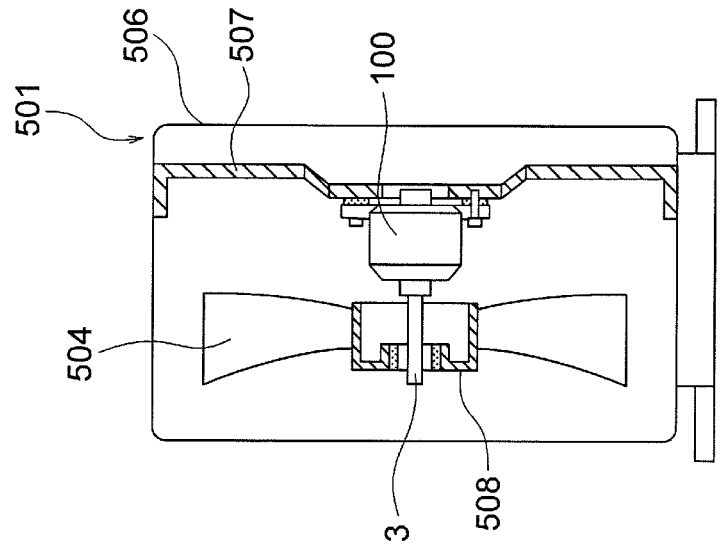
FIGS. 20(A) and 20(B) are a front view and a sectional view illustrating an outdoor unit of the air conditioning apparatus illustrated in FIG. 19.
Figure 20B:
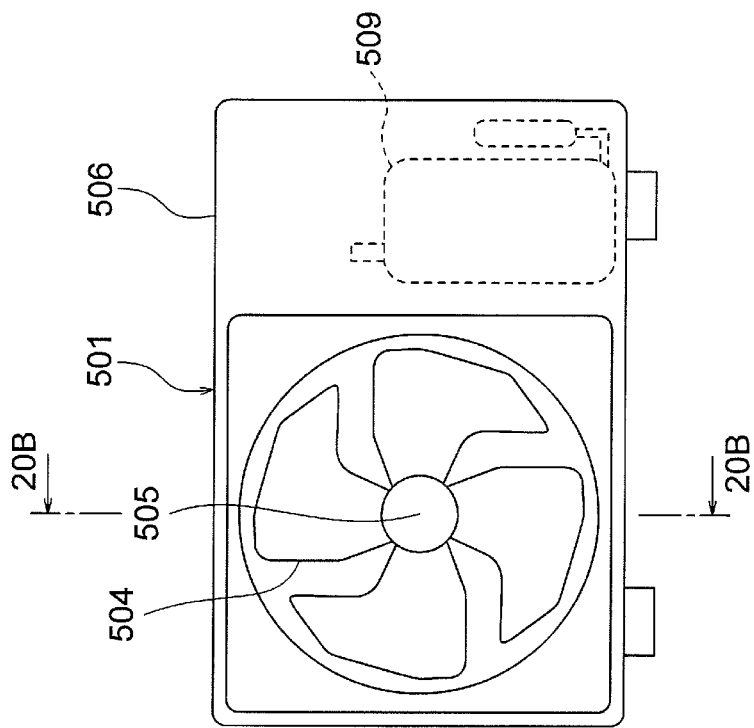

FIG. 20(A) is a front view illustrating a configuration of the outdoor unit 501. FIG. 20(B) is a sectional view taken along a line 20B-20B illustrated in FIG. 20(A). The outdoor unit 501 includes a housing 506, and a frame 507 fixed in the housing 506. The motor 100 as a driving source for the outdoor fan 505 is fixed to the frame 507. An impeller 504 is fixed to the shaft 3 of the motor 100 via a hub 508.

The motor 100, the hub 508, and the impeller 504 constitute the outdoor fan 505. FIG. 20(A) also illustrates a compressor 509 for compressing refrigerant. As the compressor 509, the rotary compressor 300 illustrated in FIG. 17 may be used. When the rotor 1 of the motor 100 rotates, the impeller 504 fixed to the shaft 3 rotates and blows air outdoors. When the air conditioning apparatus 500 operates in a cooling mode, heat dissipated when a condenser (not illustrated) condenses the refrigerant compressed by the compressor 509 is released outdoors by the air blown by the outdoor fan 505.

The motor 100 in each of the above described embodiments suppresses demagnetization of the permanent magnets 2 to thereby suppress reduction in magnetic flux of the permanent magnets 2, and to enhance motor efficiency and increase output. Hence, by using the motor 100 as a power source for the outdoor fan 505, operating efficiency of the air conditioning apparatus 500 can be enhanced and output can be increased.

Although the motor described in each of the embodiments is used herein for the outdoor fan 505 of the outdoor unit 501, the motor in each of the embodiments may also be used for the fan of the indoor unit 502.

Although the example in which the magnetized permanent magnets 2 are disposed in the magnet insertion holes 11 is described herein, the same effects can be obtained even when non-magnetized permanent magnets 2 are disposed in the magnet insertion holes 11. However, the effects of each of the embodiments can be more remarkably exhibited when the magnetized permanent magnets 2 are disposed in the magnet insertion holes 11, because a temperature at which the magnetized permanent magnets 2 are demagnetized is lower than a temperature at which performance and quality of the non-magnetized permanent magnets 2 deteriorate.

While desirable embodiments of the present invention have been described in detail above, the present invention is not limited thereto, and various improvements or modifications may be made without departing from the gist of the present invention.

What is claimed is:

1. A rotor comprising:
a rotor core having an inner circumference in an annular shape about an axis, and an outer circumference positioned on an outer side of the inner circumference in a radial direction about the axis, the rotor core being formed by electromagnetic steel sheets,
wherein the rotor core has a first magnet insertion hole and a second magnet insertion hole along the outer circumference and adjacent to each other in a circumferential direction about the axis, and has a first slit and a second slit along the inner circumference and adjacent to each other in the circumferential direction,
wherein a first permanent magnet is disposed in the first magnet insertion hole, and a second permanent magnet is disposed in the second magnet insertion hole,
wherein the first slit has a first facing portion that faces the second slit, and the second slit has a second facing portion that faces the first slit,
wherein the first facing portion has a first inner end at an inner end of the first facing portion in the radial direction, and a first outer end at an outer end of the first facing portion in the radial direction,
wherein the second facing portion has a second inner end at an inner end of the second facing portion in the radial direction, and a second outer end at an outer end of the second facing portion in the radial direction,
wherein the rotor core has an inter-slit portion between the first facing portion and the second facing portion, the inter-slit portion being defined by a first straight line connecting the first inner end to the second inner end and a second straight line connecting the first outer end to the second outer end,
wherein the inter-slit portion is disposed on an inner side in the radial direction of an inter-pole portion between the first magnet insertion hole and the second magnet insertion hole, and
wherein when D1 represents a minimum distance from the inner circumference of the rotor core to the first slit and the second slit in the radial direction, W1 represents a minimum width of the first slit and the second slit in the radial direction, and W2 represents a length of the inter-slit portion in the radial direction, at least one of D1<W1 and D1<W2 is satisfied.

2. The rotor according to claim 1, wherein both of D1<W1 and D1<W2 are satisfied.

3. The rotor according to claim 1, wherein a minimum width of the inter-slit portion in the circumferential direction is equal to or larger than a sheet thickness of the electromagnetic steel sheets, and is smaller than two times the sheet thickness.

4. The rotor according to claim 1, wherein the rotor core has a first opening portion extending from the first slit toward the first magnet insertion hole, and a second opening portion extending from the second slit toward the second magnet insertion hole.

5. The rotor according to claim 4, wherein each of a distance from the first opening portion to the first magnet insertion hole and a distance from the second opening portion to the second magnet insertion hole is equal to or larger than a sheet thickness of the electromagnetic steel sheets, and is smaller than two times the sheet thickness.

6. The rotor according to claim 1, wherein the rotor core has a first number of magnet insertion holes including the first magnet insertion hole and the second magnet insertion hole,
wherein the rotor core has a second number of slits including the first slit and the second slit, and
wherein the second number is a number obtained by dividing the first number by a natural number.

7. The rotor according to claim 1, wherein the rotor core further has an air hole disposed on an outer side of the first slit and the second slit in the radial direction.

8. The rotor according to claim 7, wherein the air hole is disposed on an inner side of the inter-pole portion in the radial direction.

9. The rotor according to claim 7, wherein a minimum distance from the air hole to the first slit and the second slit is equal to or larger than a sheet thickness of the electromagnetic steel sheets, and is smaller than two times the sheet thickness.

10. The rotor according to claim 7, wherein the rotor core has a first number of magnet insertion holes including the first magnet insertion hole and the second magnet insertion hole, and wherein the rotor core has air holes whose number is the first number, the air holes including the air hole on an outer side of the first slit and the second slit in the radial direction.

11. The rotor according to claim 10, wherein one or more rivets are inserted into one or more of the air holes, wherein the number of the rivets is equal to or smaller than half the number of the air holes.

12. The rotor according to claim 11, wherein the air holes in each of which a rivet of the one or more rivets is inserted, and the air holes in each of which no rivet is inserted are alternately arranged in the circumferential direction.

13. The rotor according to claim 1, wherein a distance from the axis to the inner circumference of the rotor core is equal to or larger than a minimum distance from the inner circumference of the rotor core to the first magnet insertion hole and the second magnet insertion hole.

14. The rotor according to claim 1, wherein the first facing portion has curved portions at both ends of the first facing portion in the radial direction, and the second facing portion has curved portions at both ends of the second facing portion in the radial direction, and wherein each of the curved portions of the first facing portion and the curved portions of the second facing portion has a radius of curvature equal to or smaller than a sheet thickness of the electromagnetic steel sheets.

15. The rotor according to claim 14, wherein the first facing portion has a linearly extending portion between the curved portions of the first facing portion, and the second facing portion has a linearly extending portion between the curved portions of the second facing portion.

16. The rotor according to claim 1, further comprising a shaft fixed to the inner circumference of the rotor core, wherein the electromagnetic steel sheets are stacked in a direction of the axis, and wherein at least one electromagnetic steel sheet disposed at an end in the direction of the axis has an inner circumference distanced from an outer circumference of the shaft outward in the radial direction.

17. The rotor according to claim 16, wherein the inner circumference of the at least one electromagnetic steel sheet is located on an outer side in the radial direction of an innermost portion of the first slit and the second slit in the radial direction.

18. The rotor according to claim 1, further comprising an end plate disposed at least at one end of the rotor core in a direction of the axis, wherein the end plate has an inner circumference located on an outer side in the radial direction of an innermost portion of the first slit and the second slit of the rotor core in the radial direction.

19. The rotor according to claim 18, wherein the end plate has an opening extending outward in the radial direction from the inner circumference of the end plate.

20. A motor comprising:

the rotor according to claim 1; and a stator provided on an outer side of the rotor in the radial direction and surrounding the rotor.

21. A compressor comprising a motor, and a compression element driven by the motor, the motor comprising:

the rotor according to claim 1; and a stator provided on an outer side of the rotor in the radial direction and surrounding the rotor.

22. A fan comprising an impeller, and a motor to rotate the impeller, the motor comprising:

the rotor according to claim 1; and a stator provided on an outer side of the rotor in the radial direction and surrounding the rotor.

23. An air conditioning apparatus comprising an outdoor unit, an indoor unit, and a refrigerant pipe connecting the outdoor unit to the indoor unit, at least one of the outdoor unit and the indoor unit comprising a fan, the fan comprising an impeller, and a motor to rotate the impeller, the motor comprising:

the rotor according to claim 1; and a stator provided on an outer side of the rotor in the radial direction and surrounding the rotor.

* * * * *